(12) United States Patent
Mori et al.

(10) Patent No.: US 11,861,841 B2
(45) Date of Patent: Jan. 2, 2024

(54) LANE ESTIMATION DEVICE, METHOD, AND PROGRAM

(71) Applicant: NIPPON TELEGRAPH AND TELEPHONE CORPORATION, Tokyo (JP)

(72) Inventors: Kohei Mori, Musashino (JP); Ippei Shake, Musashino (JP); Yuki Yokohata, Musashino (JP); Manabu Yoshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 401 days.

(21) Appl. No.: 17/255,838

(22) PCT Filed: Jun. 20, 2019

(86) PCT No.: PCT/JP2019/024570
§ 371 (c)(1),
(2) Date: Dec. 23, 2020

(87) PCT Pub. No.: WO2020/004231
PCT Pub. Date: Jan. 2, 2020

(65) Prior Publication Data
US 2021/0279484 A1    Sep. 9, 2021

(30) Foreign Application Priority Data

Jun. 27, 2018   (JP) .................................. 2018-121714

(51) Int. Cl.
*G06K 9/00* (2022.01)
*G06T 7/11* (2017.01)
(Continued)

(52) U.S. Cl.
CPC ............... *G06T 7/11* (2017.01); *B60W 30/12* (2013.01); *B60W 30/18163* (2013.01);
(Continued)

(58) Field of Classification Search
None
See application file for complete search history.

(56) References Cited

FOREIGN PATENT DOCUMENTS

| DE | 102014118691 A1 * | 7/2015 | ........... B62D 15/025 |
| JP | 2000132677 A | 5/2000 | |

(Continued)

OTHER PUBLICATIONS

International Search Report issued in PCT/JP2019/024570, dated Sep. 3, 2019.

*Primary Examiner* — Wei Wen Yang
(74) *Attorney, Agent, or Firm* — Harness, Dickey & Pierce, P.L.C.

(57) ABSTRACT

A technology is provided whereby a lane can be correctly estimated without relying on lane markers. A shape indicating a road region is extracted from image data obtained by capturing images in the progression direction of a vehicle 6 and, on the basis of information indicating the shape, the angle of inclination for one contour line, the center-of-gravity coordinates for a diagram indicating the shape of the road region, the angle between two consecutive contour lines across one vertex of the diagram indicating the shape, and the area of the diagram indicating the shape are calculated as feature values for the shape of the road region. In addition, the lane in which the vehicle 6 is traveling can be estimated by determining whether or not the calculated feature values are included in a threshold value range preset for each lane.

8 Claims, 23 Drawing Sheets

(51) Int. Cl.
  *B60W 30/12* (2020.01)
  *B60W 30/18* (2012.01)
  *B60W 40/06* (2012.01)
  *G06V 20/56* (2022.01)
  *G06V 10/44* (2022.01)
  *G06V 10/20* (2022.01)

(52) U.S. Cl.
  CPC ........... *B60W 40/06* (2013.01); *G06V 10/255* (2022.01); *G06V 10/44* (2022.01); *G06V 20/588* (2022.01); *B60W 2552/10* (2020.02); *B60W 2552/53* (2020.02)

(56) References Cited

FOREIGN PATENT DOCUMENTS

| | | | |
|---|---|---|---|
| JP | 2003044978 A | | 2/2003 |
| JP | 2005157731 A | | 6/2005 |
| JP | 2014194698 A | | 10/2014 |
| JP | 2015001773 A | | 1/2015 |
| JP | 2019016246 A | * | 1/2019 |
| JP | 2019194037 A | * | 11/2019 |

\* cited by examiner

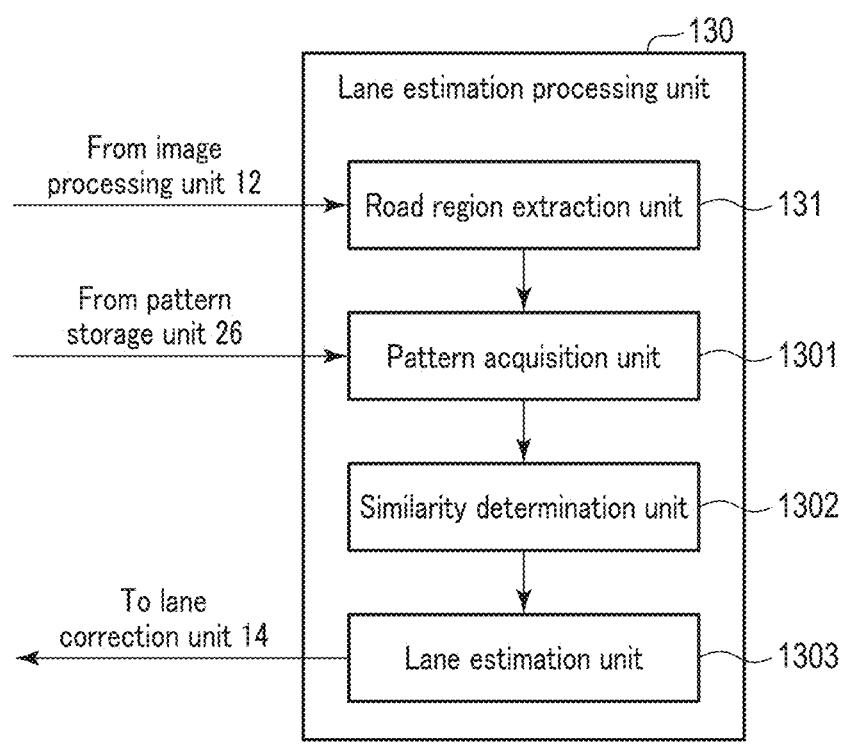
F I G. 23

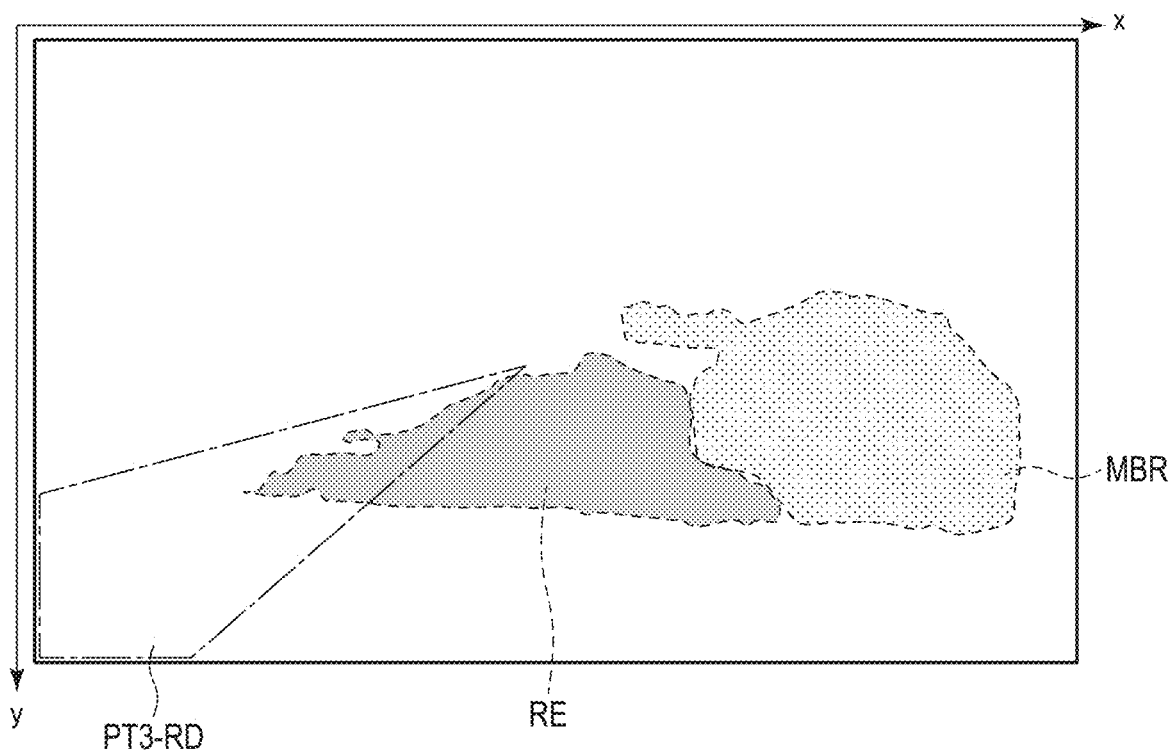
F I G. 30

LANE ESTIMATION DEVICE, METHOD, AND PROGRAM

CROSS-REFERENCE TO RELATED APPLICATIONS

This is a U.S. national phase application under 35 USC 371 of international application PCT/JP2019/024570, (not published in English) filed on Jun. 20, 2019, which claims priority to Japanese patent application No. 2018-121714, filed on Jun. 27, 2018. The entire disclosures of the above applications are incorporated herein by reference.

FIELD

The present invention relates generally to a device, a method, and a program for estimating, for example, a lane formed on a road in which a vehicle or a person travels or walks.

BACKGROUND

In recent years, for example, technologies relating to travel control and driving support of automobiles have been actively developed. It is very important to accurately recognize the lane in which a vehicle is traveling on the road in order to safely control the traveling vehicle. Conventionally, there has been reported a technique for estimating a lane of a vehicle by detecting lane markers that divide a lane by image processing using a video of a road surface captured by a camera mounted on the vehicle (for example, see Patent Literature 1).

CITATION LIST

Patent Literature

Patent Document 1: Jpn. Pat. Appln. KOKAI Publication No. 2005-157731

SUMMARY

Technical Problem

In the technique of estimating the lane based on the lane markers on the road surface described in Patent Document 1, however, there is a problem wherein the lane cannot be accurately estimated in a case where there is a repair mark due to construction or the like in addition to the normal lane markers, or in a case where the lane markers become faint or disappear due to deterioration over time.

The present invention has been made in view of the above circumstances, and an object of the present invention is to provide a technique for allowing a lane that is being traveled in to be accurately estimated without relying on lane markers.

Solution to Problem

In order to achieve the above object, according to a first aspect of the present invention, a device, a method, or a program for estimating a lane in which a moving object is moving on a road comprises: acquiring image data obtained by the moving object imaging a range including a road region; recognizing a shape indicating the road region from the acquired image data; calculating a feature value of the road region based on the recognized shape; and estimating the lane in which the moving object is moving based on the calculated feature value.

According to the first aspect of the present invention, for example, the shape indicating the road region is recognized from the image data obtained by imaging a progression direction of a vehicle, the feature value of the road region is calculated based on the shape thereof, and the lane in which the moving object is moving is estimated based on the feature value. That is, the lane is estimated by focusing on the feature of the shape indicating the road region when viewed from the moving object. Therefore, it is possible to estimate the lane in which the moving object is moving without relying on the lane markers dividing lanes on the road, thereby allowing the lane to be estimated even in a case where a repair mark of the lane marker remains due to construction or the like, or in a case where the lane marker fades or disappears due to deterioration over time.

A second aspect of the present invention estimates the lane in which a moving object is moving by performing in the first aspect: calculating, based on the recognized shape indicating the road region, an inclination angle of a contour line of the recognized shape as the feature value of the road region; and determining which threshold value range preset for each lane includes the calculated inclination angle of the contour line.

According to the second aspect of the present invention, it is possible to estimate the lane in which the moving object is moving by, for example, focusing on the fact that the inclination angle of the contour line indicating the road shoulder or the like of the road region differs depending on the position of the lane in which the moving object is moving when viewed from the moving object. In general, since the contour of the road can be recognized from the image data on any road, it is possible to reliably estimate the lane even on a road on which the lane marker cannot be recognized.

A third aspect of the present invention estimates the lane in which a moving object is moving by performing in the first aspect: calculating, based on a shape indicating a road region, at least one of a center-of-gravity coordinate of a diagram indicating the shape, an angle of a vertex of the diagram indicating the shape or a virtual diagram derived from the diagram, or an area of the diagram indicating the shape as the feature value of the road region; and determining whether the calculated center-of-gravity coordinate of the diagram, the angle of a vertex, and the area of the diagram are included in a range of a threshold value set for each lane.

According to the third aspect of the present invention, at least one of the center-of-gravity coordinate of the diagram indicating the road region, the angle of a vertex of the diagram or the virtual diagram derived from the diagram, or the area of the diagram is calculated as the feature value of the road region, and the lane is estimated based on the calculation result. Therefore, also in this case, since the lane is estimated based on the feature value obtained from the shape indicating the road region, it is possible to reliably estimate the lane even for a road on which a lane marker cannot be detected.

A fourth aspect of the present invention estimates the lane in which a moving object is moving by performing in the first aspect: calculating at least one of an angle between two sides of a diagram obtained by converting a shape indicating the road region into a triangle having one side in a vertical direction of a screen indicated by the image data or an area of the triangle as the feature value of the road region; and determining which threshold value range preset for each lane includes the calculated angle between two sides or area of the diagram.

According to the fourth aspect of the present invention, the shape indicating the road region is converted into a triangle having one side in the vertical direction of the screen indicated by the image data, and the lane is estimated using the angle between the two sides or the area of the triangle as the feature value of the road region. Therefore, also in this case, since the lane is estimated based on the feature value obtained from the shape indicating the road region, it is possible to reliably estimate the lane even for a road on which a lane marker cannot be detected.

A fifth aspect of the present invention performs in the first aspect: recognizing a first shape indicating a road region including an object present on a road and a second shape indicating a region of the road region excluding the object from the image data, respectively; and estimating a contour line of the road region based on the recognized first shape and second shape to calculate an inclination angle thereof. The fifth aspect estimates the lane in which a moving object is moving by determining which threshold value range preset for each lane includes the calculated inclination angle of the contour line.

According to the fifth aspect of the present invention, in a case where an object such as another traveling vehicle exists on the road region, the first shape indicating the entire road region including the object and the second shape indicating the region of the road region excluding the object are recognized respectively from image data, and the contour line of the road region is estimated on the assumption that the object does not exist based on each of the recognized first and second shapes. The lane in which the moving object is moving is estimated based on the estimated inclination angle of the contour line. Therefore, for example, even in a case where the road shoulder or the left end portion of the traveling lane is hidden by another vehicle traveling in the lane on the road shoulder side, it is possible to estimate the contour line of the road shoulder or the left end portion of the traveling lane, to estimate the lane based on the estimation result.

A sixth aspect of the present invention estimates the lane in which a moving object is moving by performing in the first aspect: acquiring pixel value data obtained by labeling each pixel in the road region based on a shape indicating the road region as the feature value of the road region; and determining which of a plurality of patterns preset for the road region is similar to the acquired pixel value data.

A seventh aspect of the present invention estimates the lane in which a moving object is moving by performing in the first aspect: acquiring pixel value data obtained by labeling each pixel in the road region based on a shape indicating the road region as the feature value of the road region; and determining which pattern preset for each lane included in the road region is similar to the acquired pixel value data.

According to the sixth or seventh aspect of the present invention, the lane in which the moving object is moving is estimated by, for example, focusing on the fact that the shape of the road region as viewed from the moving object differs depending on the lane in which the moving object is moving, and determining which preset pattern is similar to the pixel value data labeled for each pixel with respect to the road region in the image data. Therefore, when the road region is included in the image data, it is possible to determine whether the pixel value data is similar to the pattern, and to estimate which lane the moving object is moving in without depending on the lane marker.

An eighth aspect of the present invention estimates the lane in which a moving object is moving by performing in the first aspect: recognizing a first shape indicating a road region including an object present on the road region as a feature value of the road region; acquiring pixel value data obtained by labeling each pixel in the first shape; and determining which preset pattern is similar to the acquired pixel value data.

According to the eighth aspect of the present invention, in a case where the object is present on the road region, the lane in which the moving object is moving is estimated by recognizing the first shape indicating the road region including the object, acquiring the pixel value data obtained by labeling each pixel in the first shape, and determining which preset pattern is similar to the pixel value data. Therefore, even when an object is present on the road region and information based on the shape of the road region obtained from the image data is not sufficient, it is possible to efficiently estimate which lane the moving object is moving in by regarding the object as a part of the road region.

A ninth aspect of the present invention corrects a current lane estimation result based on at least one of information indicating a lane change history of a moving object estimated from lane estimation results obtained in the past, information relating to a configuration of a road corresponding to a movement position of the moving object, or information indicating a lane change in a road region estimated from a state of movement of the moving object.

According to the ninth aspect of the present invention, the current lane estimation result is corrected based on at least one of the lane change history of the moving object, the information on the configuration of the road on which the moving object is moving, and the information indicating whether or not the moving object has changed lanes. Therefore, for example, even in a case where clear image data cannot be obtained or a road region cannot be accurately recognized from the image data due to the influence of weather, illuminance, or the like, it is possible to correct the estimation result of the lane in which the moving object is currently moving, which would allow an accurate lane estimation result to be obtained.

Advantageous Effects of Invention

That is, according to each aspect of the present invention, it is possible to provide a technique capable of accurately estimating a lane in which a moving object is moving without depending on a lane marker.

BRIEF DESCRIPTION OF THE DRAWINGS

FIG. 23 is a block diagram showing a functional configuration of a lane estimation processing unit shown in FIG. 22.

FIG. 30 is a diagram showing another example of an image to be compared with a region pattern at a pixel level based on an extraction result from image data.

DETAILED DESCRIPTION

Hereinafter, embodiments of the present invention will be explained with reference to the drawings.

First Embodiment (Configuration)

(1) System

Figure 1:
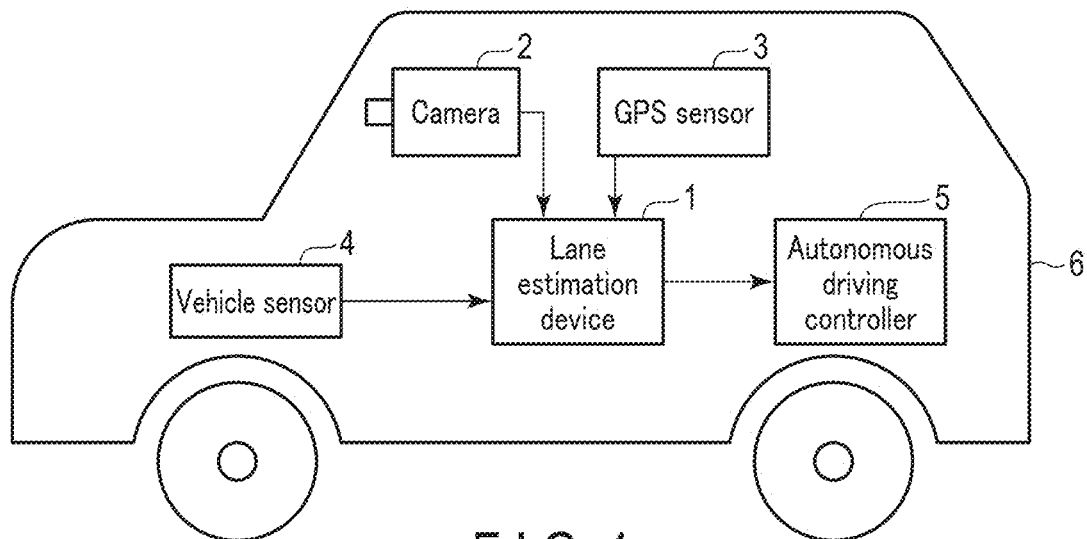
FIG. 1 is a schematic configuration diagram of an on-vehicle control system including a lane estimation device according to an embodiment of the present invention.

FIG. 1 is a schematic configuration diagram of an on-vehicle system including a lane estimation device according to an embodiment of the present invention. A vehicle 6 includes a lane estimation device 1, a camera 2, a global positioning system (GPS) sensor 3, a vehicle sensor 4, and an autonomous driving controller 5.

The camera 2 uses, for example, a solid-state imaging device such as a complementary metal oxide semiconductor (CMOS) sensor, and an installation location, a direction, and an angle are set so that at least a road region in a progression direction of the vehicle 6 is included in an imaging range. The camera 2 outputs image data obtained by imaging a range including the road region in the progression direction of the vehicle 6 to the lane estimation device 1.

Although the camera 2 may be provided exclusively for lane estimation, any camera can be used as long as it can obtain equivalent image data, such as a camera of a drive recorder or a camera mounted for other purposes. For example, when the vehicle is a two-wheeled vehicle or a bicycle, a camera provided on a helmet of a driver may be used, or a camera provided on a mobile terminal such as a smartphone carried by a fellow passenger of the vehicle may be used. The camera may be an infrared camera. The image data may be moving image data, or may be still-image data imaged at regular time intervals.

The GPS sensor 3 calculates the latitude and longitude of the vehicle 6 by receiving GPS signals transmitted from a plurality of GPS satellites and performing a ranging operation, and outputs the calculated latitude and longitude to the lane estimation device 1 as position data of the vehicle 6. Instead of the GPS sensor 3, a ground (road) based positioning system (GBPS) or the like may be used as long as the same function as the GPS sensor is exhibited.

The vehicle sensor 4 detects information indicating a state of movement of the vehicle 6, such as a speed, an acceleration, and a rotation speed of an engine of the vehicle 6, for example, in order to perform on-board diagnostics (OBD) of the vehicle 6, and outputs the detection result to the lane estimation device 1 as vehicle sensor data. The vehicle sensor 4 may include a sensor for detecting a steering angle of a steering wheel or the like in addition to sensors for detecting a speed, an acceleration, and a rotation speed of an engine, and may further include a sensor used for a purpose other than OBD.

The autonomous driving controller 5 performs control for causing the vehicle 6 to travel fully automatically or semi-automatically based on images imaged by a vehicle exterior camera and a driver camera or sensor data output from various on-vehicle sensors, and uses data indicating a lane estimation result output from the lane estimation device 1 as one type of the sensor data.

(2) Lane Estimation Device (2-1) Hardware Configuration

Figure 2:
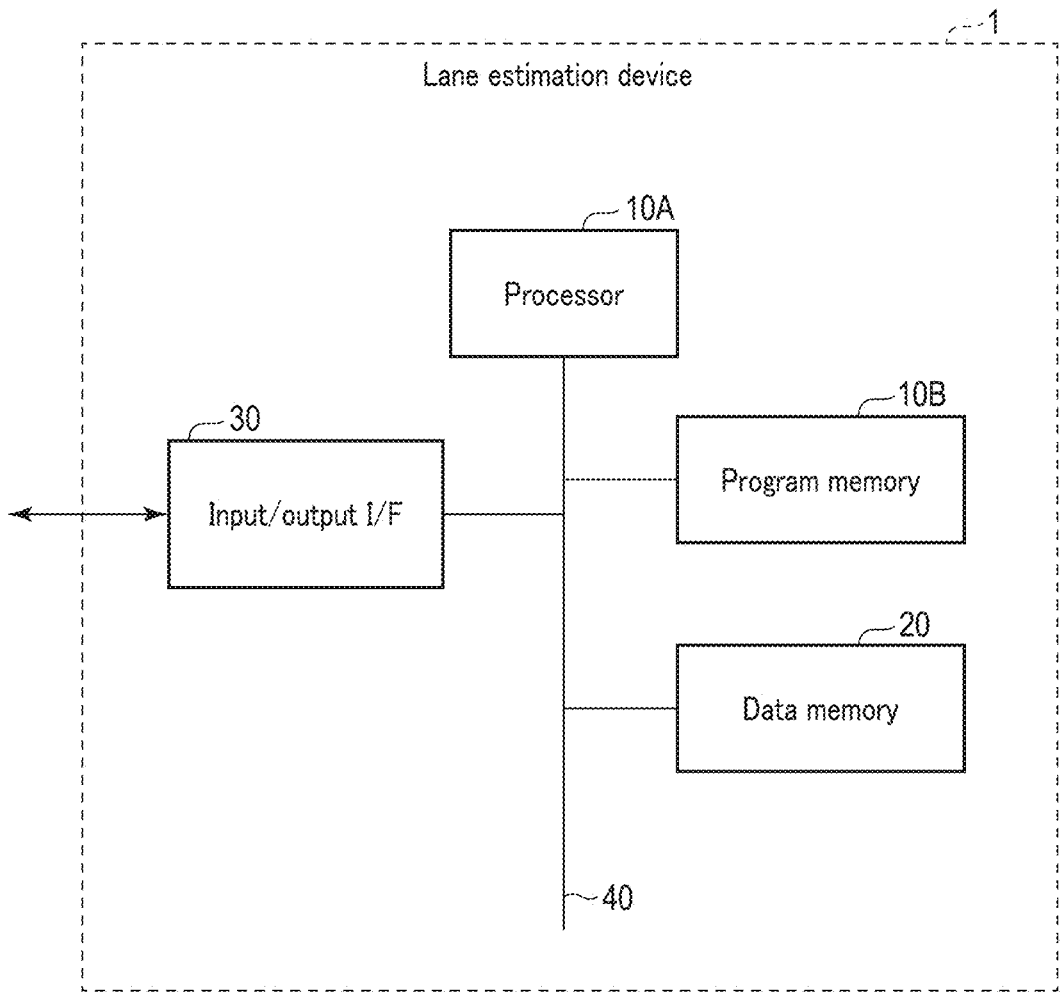
FIG. 2 is a block diagram showing a hardware configuration of a lane estimation device according to an embodiment of the present invention.

The lane estimation device 1 estimates a lane in which the vehicle 6 is traveling, and is configured by, for example, a personal computer. FIG. 2 is a block diagram showing an example of a hardware configuration of the lane estimation device 1.

The lane estimating device 1 includes a hardware processor 10A such as a central processing unit (CPU), to which a program memory 10B, a data memory 20, and an input/output interface unit (hereinafter referred to as an input/output I/F) 30 are connected via a bus 40.

External devices such as a camera 2, a GPS sensor 3, a vehicle sensor 4, and an autonomous driving controller 5 are connected to the input/output I/F 30. The input/output I/F 30 receives data from the camera 2, the GPS sensor 3, and the vehicle sensor 4, and outputs data indicating an estimation result generated by the lane estimation device 1 to the autonomous driving controller 5. The input/output I/F 30 may include a wired or wireless communication interface.

The program memory 10B uses, as a storage medium, a combination of a nonvolatile memory such as a hard disk drive (HDD) or a solid state drive (SDD) that can be written to and read from at any time and a nonvolatile memory such as a ROM, and stores programs necessary for executing various control processes according to the embodiment.

The data memory 20 uses, as a storage medium, a combination of a nonvolatile memory such as an HDD or an SSD that can be written to and read from at any time and a volatile memory such as a random access memory (RAM), and is used to store various types of data acquired and created in the course of performing various types of processing.

(2-2) Software Configuration

Figure 3:
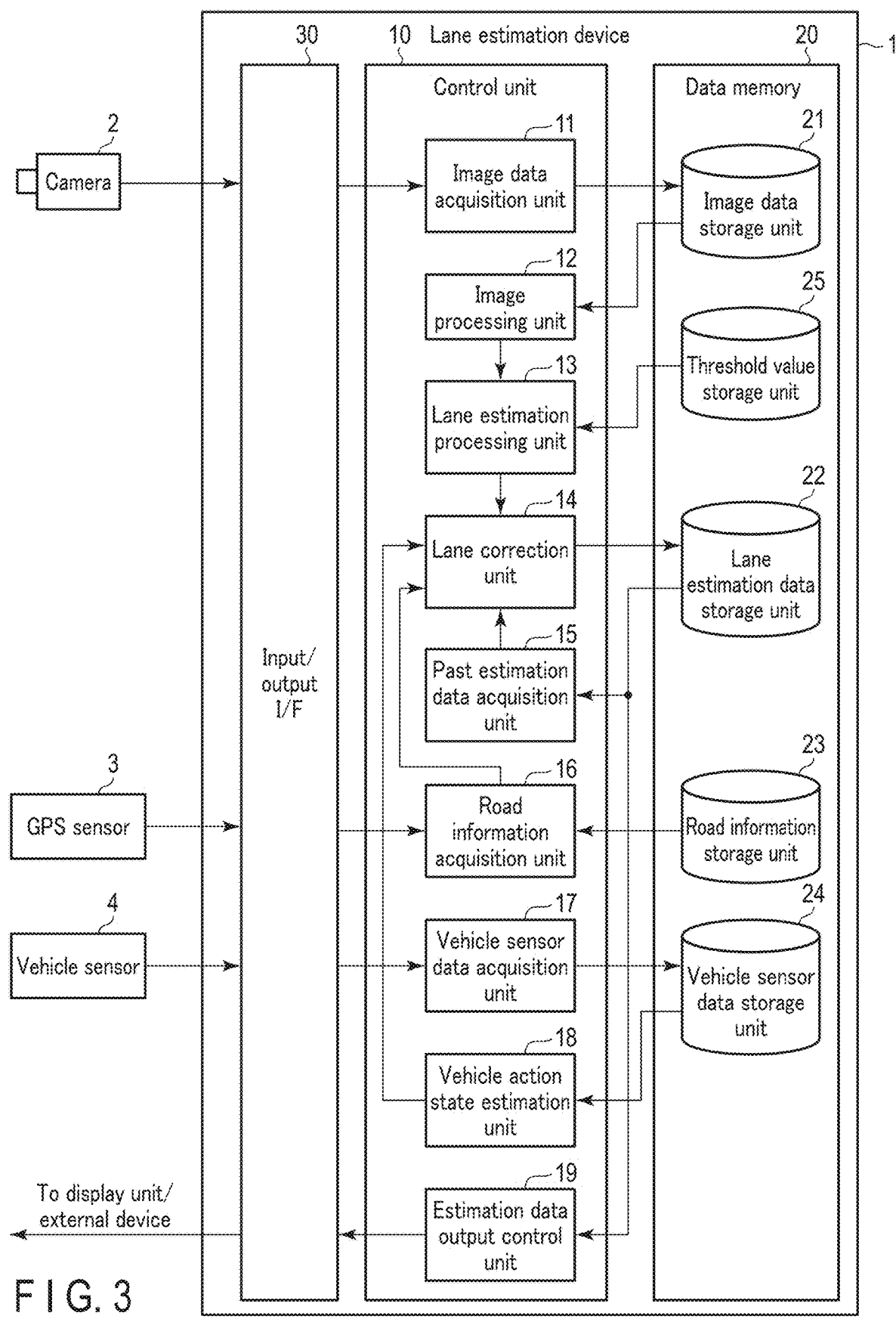
FIG. 3 is a block diagram showing a software configuration of a lane estimation device according to a first embodiment of the present invention.

FIG. 3 is a block diagram showing a software configuration of the lane estimation device 1 according to the first embodiment of the present invention in association with the hardware configuration shown in FIG. 2.

The input/output I/F 30 receives each type of data output from the camera 2, the GPS sensor 3, and the vehicle sensor 4, supplies the data to a control unit 10, and outputs data indicating a lane estimation result output from the control unit 10 to the autonomous driving controller 5. The input/output I/F 30 generates display data for displaying the lane estimation result, and outputs the display data to, for example, a display unit of a car navigation device of the vehicle 6 for display.

The storage region of the data memory 20 includes an image data storage unit 21, a lane estimation data storage unit 22, a road information storage unit 23, a vehicle sensor data storage unit 24, and a threshold value storage unit 25.

The image data storage unit 21 is used to store image data obtained by the camera 2. The lane estimation data storage unit 22 is used to store data indicating a lane estimation result obtained by the control unit 10, which will be described later, in association with the estimation date and time, position data of the vehicle 6, and the like. In the road information storage unit 23, for example, information indicating a configuration of a road corresponding to a position is stored in advance in association with position data indicated by latitude and longitude. The information indicating the configuration of the road includes, for example, the number of lanes in each of the upward and downward directions, the presence or absence of sidewalks, road shoulders, side strips, and median strips, and information indicating the widths thereof. The vehicle sensor data storage unit 24 is used to store vehicle sensor data output from the vehicle sensor 4 in association with information indicating a data type and a detection time. The threshold value storage unit 25 is used to store threshold values related to various feature values set in advance for each lane.

The control unit 10 is configured by the hardware processor 10A and the program memory 10B, and includes, as a processing function unit executed by software, an image data acquisition unit 11, an image processing unit 12, a lane estimation processing unit 13, a lane correction unit 14, a past estimation data acquisition unit 15, a road information acquisition unit 16, a vehicle sensor data acquisition unit 17, a vehicle action state estimation unit 18, and an estimation data output control unit 19.

The functions of the processing units 11 to 19 are realized by causing the CPU (hardware processor) 10A to execute a program stored in the program memory 10B. The program for executing the processes of the processing units 11 to 19 may be stored in advance in the program memory 10B in the lane estimation device 1 or may be stored in an application server or the like on a network, and used. In this case, the lane estimation device 1 executes the functions of the processing units 11 to 19 by downloading a necessary program from an application server via a network when necessary.

The image data acquisition unit 11, as an image acquisition unit, sequentially captures image date output from the camera 2 via the input/output I/F 30, and stores the image date in the image data storage unit 21 in association with information indicating the imaging timing or the reception timing.

The image processing unit 12 reads image data from the image data storage unit 21. In the case where the image data is moving image data, still-image data is cut out at a predetermined frame cycle. In addition, the image processing unit 12 performs, for example, noise removal and calibration processing for correcting an individual difference in the performance of the camera 2, an inclination at the time of installation, and the like on the still-image data as preprocessing of lane estimation.

Figure 4:
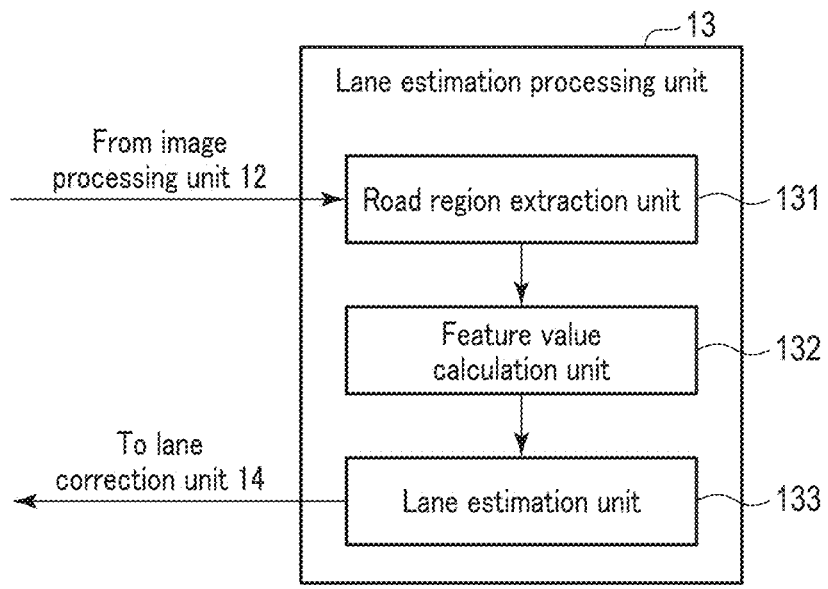
FIG. 4 is a block diagram showing a functional configuration of a lane estimation processing unit shown in FIG. 3.

The lane estimation processing unit 13 receives the image data after the preprocessing from the image processing unit 12 and performs processing of estimating a lane in which the vehicle 6 is traveling based on the image data. The lane estimation processing unit 13 includes, for example, a road region extraction unit 131, a feature value calculation unit 132, and a lane estimation unit 133 as functions thereof, as shown in FIG. 4.

The road region extraction unit 131 has the following processing functions.

(1) Processing of extracting a range corresponding to a road region from the image data received from the image processing unit 12.

(2) Processing of excluding a region erroneously extracted as a road region by using information such as the size of the area of the region, and, further, smoothing the extracted road region, etc. to extract a shape indicating the road region.

(3) In a case where an object other than a road such as another traveling vehicle is included in an image of a range corresponding to the extracted road region, processing of extracting a shape indicating a region including the object and a shape indicating a region excluding the object in the road region, respectively, and estimating a shape indicating the road region when it is assumed that the object does not exist based on the extracted shapes.

The feature value calculation unit 132 performs processing of calculating a feature value of the shape based on the shape indicating the road region extracted by the road region extraction unit 131. Details of the feature value will be described later.

The lane estimation unit 133 determines, for example, whether or not the feature value calculated by the feature value calculation unit 132 is included in a range of a threshold value set for each lane, thereby performing processing of estimating which lane the vehicle 6 is currently traveling in. As the threshold value for each lane, a general-purpose threshold value set according to the shape of a general road may be used, or a value set in advance by measurement or the like according to the shape of the road for each section of the road may be used.

The past estimation data acquisition unit 15 reads out the past lane estimation data from the lane estimation data storage unit 22, estimates the change history and the tendency of the lane in which the vehicle 6 traveled in the past based on the data, and gives the estimation information to the lane correction unit 14 as one piece of correction candidate information.

Based on the position data of the vehicle 6 detected by the GPS sensor 3, the road information acquisition unit acquires, from the road information storage unit 23, information indicating the configuration of the road at the position where the vehicle 6 is currently traveling, and supplies the road information indicating the configuration of the road to the lane correction unit 14 as one piece of correction candidate information.

The vehicle sensor data acquisition unit 17 receives vehicle sensor data, which is output from the vehicle sensor 4 and indicates the state of movement of the vehicle 6, via the input/output I/F 30, and stores the received vehicle sensor data in the vehicle sensor data storage unit in association with information indicating the measurement timing or the reception timing thereof.

The vehicle action state estimation unit 18 reads out the vehicle sensor data from the vehicle sensor data storage unit 24, estimates whether or not the vehicle 6 has made a lane change on the basis of the vehicle sensor data, and provides the estimation information to the lane correction unit 14 as one piece of correction candidate information.

The lane correction unit 14 performs predetermined correction processing on the estimation result of the lane in which the vehicle 6 is traveling, which is obtained by the lane estimation unit 133, and stores the corrected lane estimation data in the lane estimation data storage unit 22 in association with information indicating the current time. The following three types of processing may be considered for the correction processing of the lane estimation result.

(1) Processing of determining the accuracy of the estimation result of the lane in which the vehicle 6 is traveling obtained by the lane estimation unit 133 based on the road information indicating the configuration of the road at the position in which the vehicle 6 is currently traveling, which is acquired by the road information acquisition unit 16, and correcting the estimation result in a case where the estimation result can be regarded as erroneous.

(2) Processing of determining the accuracy of the estimation result of the lane in which the vehicle 6 is traveling obtained by the lane estimation unit 133 based on the information indicating the past lane change history or tendency of the vehicle 6, which is estimated by the past estimation data acquisition unit 15, and correcting the estimation result in a case where the estimation result can be regarded as erroneous.

(3) Processing of determining the accuracy of the estimation result of the lane in which the vehicle 6 is traveling obtained by the lane estimation unit 133 based on the information indicating the change in the movement of the vehicle 6 estimated by the vehicle action state estimation unit 18 and the information indicating the past lane change history of the vehicle 6 estimated by the past estimation data acquisition unit 15, and correcting the estimation result in a case where the estimation result can be regarded as erroneous.

The estimation data output control unit 19 reads out the latest lane estimation data from the lane estimation data storage unit 22 and outputs the latest lane estimation data from the input/output I/F 30 to the autonomous driving controller 5. The estimation data output control unit 19 generates display data for displaying the latest lane estimation data on, for example, map data, and outputs the display data to, for example, a display unit of a car navigation device. In addition to outputting the latest lane estimation data, the estimation data output control unit 19 may read out and output lane estimation data corresponding to an arbitrary timing in the past.

(Operation)

A lane estimation operation by the lane estimation device 1 according to the first embodiment configured in the above manner will now be described.

Figure 5:
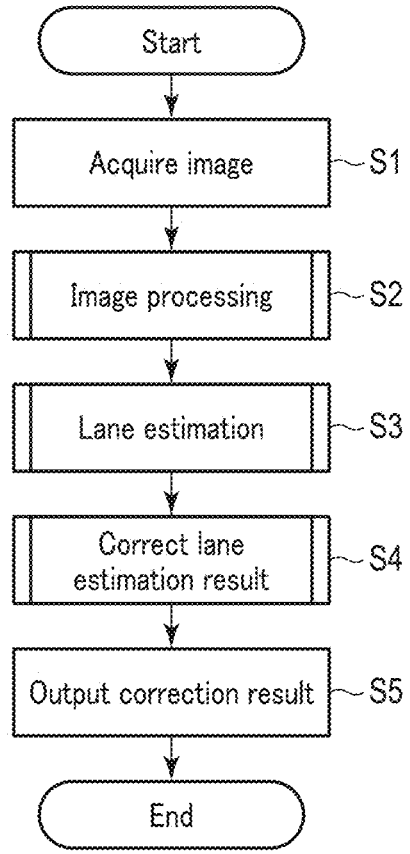
FIG. 5 is a flowchart showing an overall processing procedure and processing contents of the lane estimation device shown in FIG. 3.

FIG. 5 is a flowchart showing the overall processing procedure of the lane estimation processing by the control unit 10.

(1) Image Data Acquisition and Image Processing

While the vehicle 6 is traveling, the camera 2 images a scene including a road region in a progression direction, and the image data thereof is output from the camera 2 to the lane estimation device 1. Under the control of the image data acquisition unit 11, the control unit 10 of the lane estimation device 1 captures the image data output from the camera 2 in step S1 via the input I/F 30, and sequentially stores the image data in the image data storage unit 21 in a state of being associated with information indicating the imaging day and time.

In parallel with the image data acquisition processing, under the control of the image processing unit 12, the control unit 10 executes image processing that is necessary for lane estimation on the acquired image in step S2.

Figure 6:
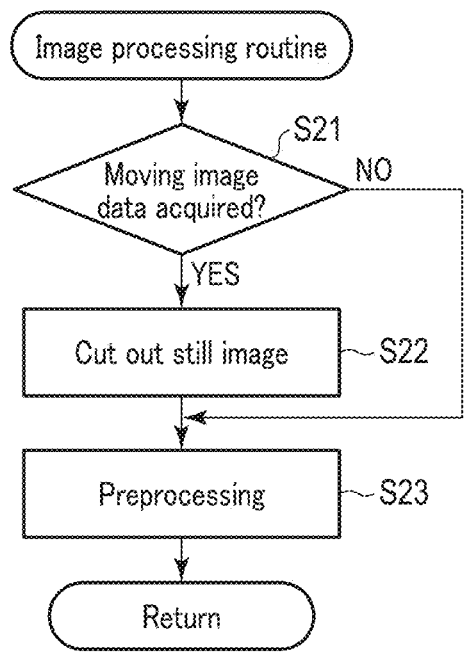
FIG. 6 is a flowchart showing a processing procedure and processing contents of an image processing routine shown in FIG. 5.

FIG. 6 is a flowchart showing a processing procedure and processing contents performed by the image processing unit 12. That is, the image processing unit 12 first reads image data from the image data storage unit 21. It is then determined in step S21 whether or not the image data is moving image data, and, in the case of it being moving image data, still-image data is cut out from the moving image data at a fixed frame cycle in step S22. In step S23, the image processing unit 12 then performs preprocessing for lane estimation on the still-image data. Here, for example, noise removal and calibration processing for correcting an individual difference in the performance of the camera 2, an inclination at the time of installation, and the like are performed. The image processing may be performed by an image processing circuit including hardware.

Figure 11:
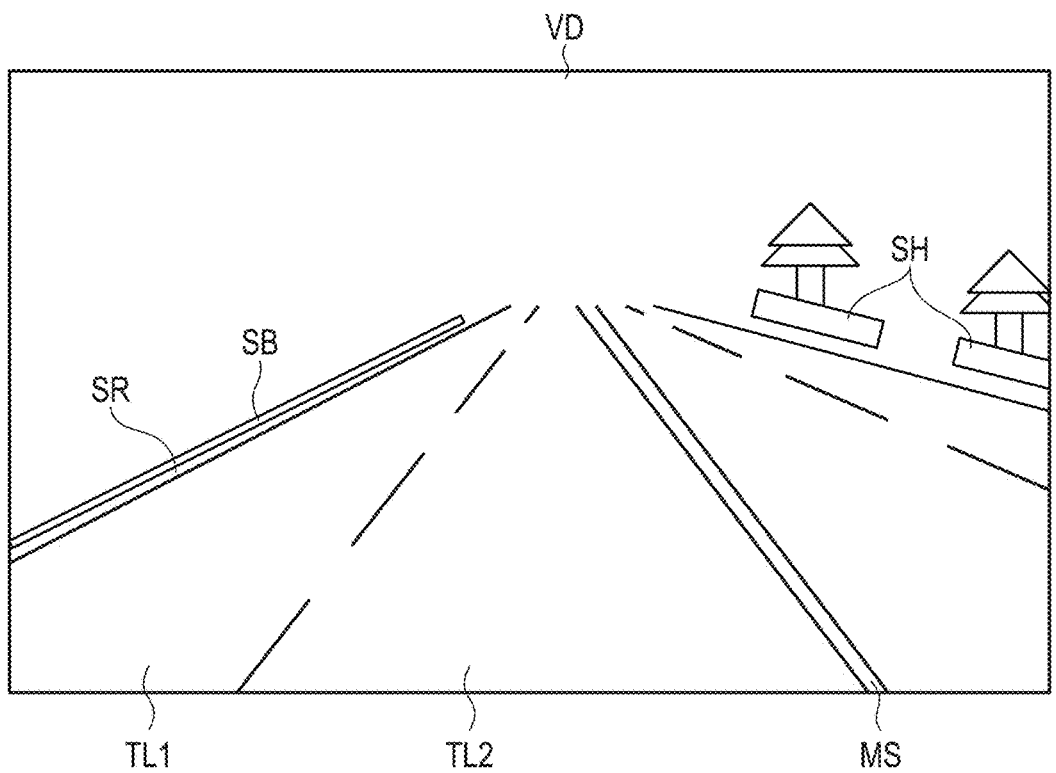
FIG. 11 is a diagram showing a first example of image data of a road obtained when a progression direction is imaged by an on-vehicle camera.

FIG. 11 shows a first example of still-image data VD after the image processing.

(2) Estimation of Traveling Lane

Under the control of the lane estimation processing unit 13, the control unit 10 of the lane estimation device 1 executes processing of estimating the lane in which the vehicle 6 is traveling in step S3, in the following manner.

Figure 7:
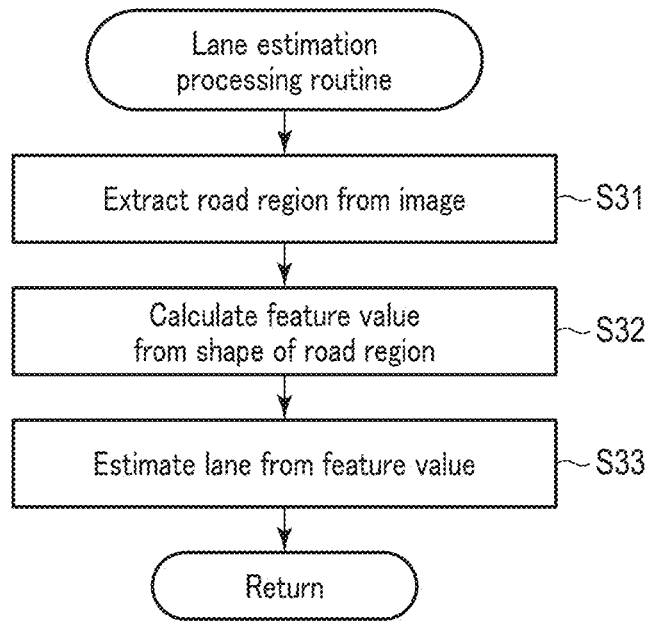
FIG. 7 is a flowchart showing a processing procedure and processing contents of a lane estimation processing routine shown in FIG. 5.

FIG. 7 is a flowchart showing a processing procedure and processing contents of the lane estimation processing unit 13.

(2-1) Road Region Extraction

The lane estimation processing unit 13, first, causes the road region extraction unit 131 to extract a road region from the preprocessed image data (step S31).

Figure 10:
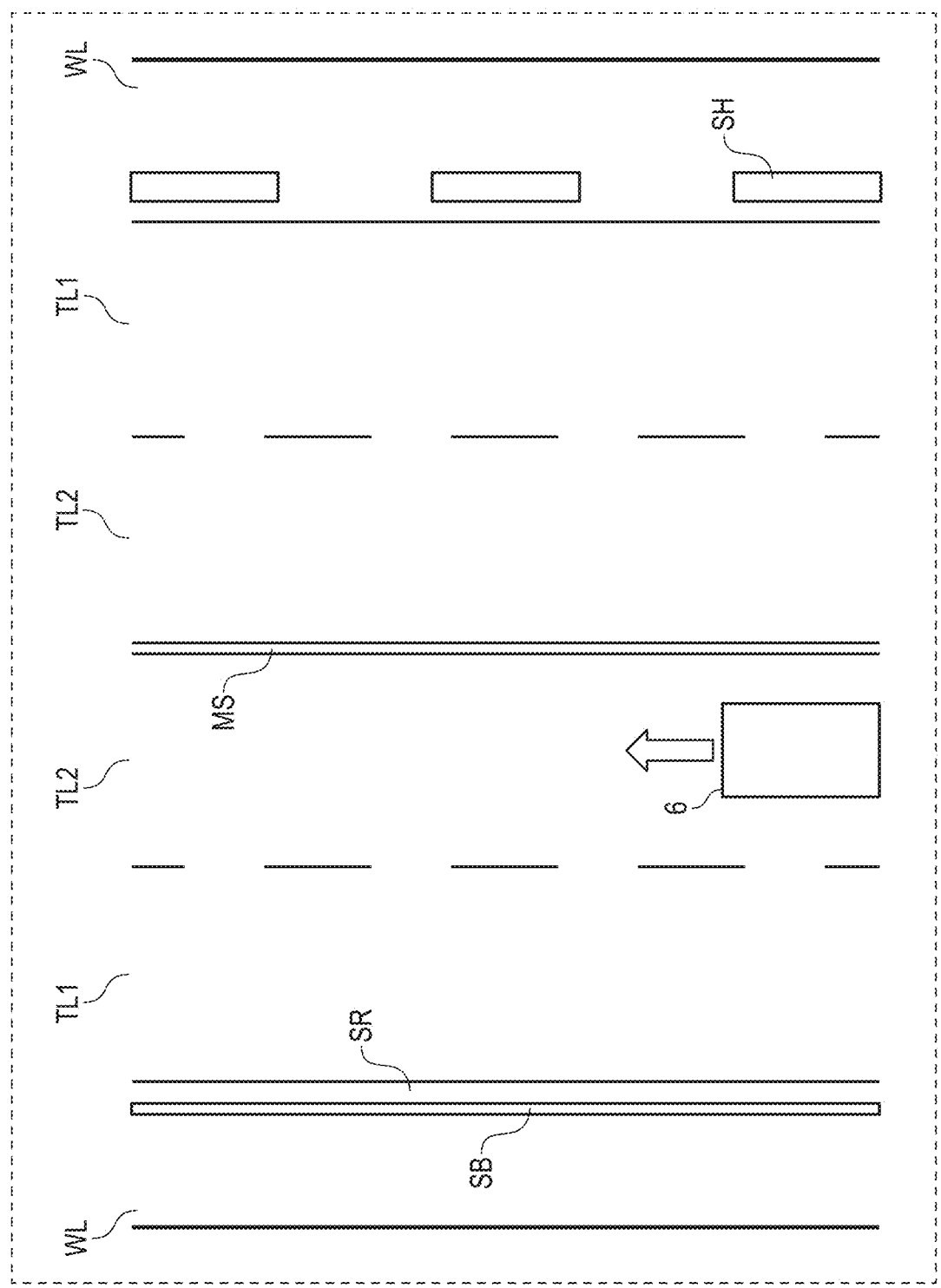
FIG. 10 is a plan view showing an example of a configuration of a road.

Here, when an example of a road with two lanes on each side is taken, as shown in, for example, FIG. 10, traveling lanes TL1 and TL2 configuring a road are disposed in each of the upward direction and the downward direction divided by a median strip MS as a boundary. A sidewalk WL is disposed outside the traveling lane TL1 with a road shoulder SR and a curb SB composed of a concrete block or with a planting SH therebetween.

For such a road, the road region extraction unit 131 extracts a region including, for example, the traveling lanes TL1 and TL2 and the road shoulder SR as the road region. As the road region, only the traveling lanes TL1 and TL2 may be extracted.

SegNet is used as an example of the road region extraction processing means. SegNet is a deep encoder/decoder architecture for realizing a labeling function on a pixel-by-pixel basis. For example, each portion included in an image is distinguished and labeled in a plurality of different display forms (for example, colors). In the present embodiment, labeling is performed using three types of regions, namely, a road region, a region of an object present on the road (for example, a vehicle region), and a region other than such regions.

Subsequently, in consideration of a case where there is a region erroneously extracted as a road region, the road region extraction unit 131 performs processing of excluding the erroneously detected region by using information such as the size of the area of the region, and further performs processing of smoothing, etc. on the extracted road region to extract a shape indicating the road region. In a case where the contour line of the shape of the extracted road region has small irregularities, for example, the contour line may be linearly approximated.

Figure 12:
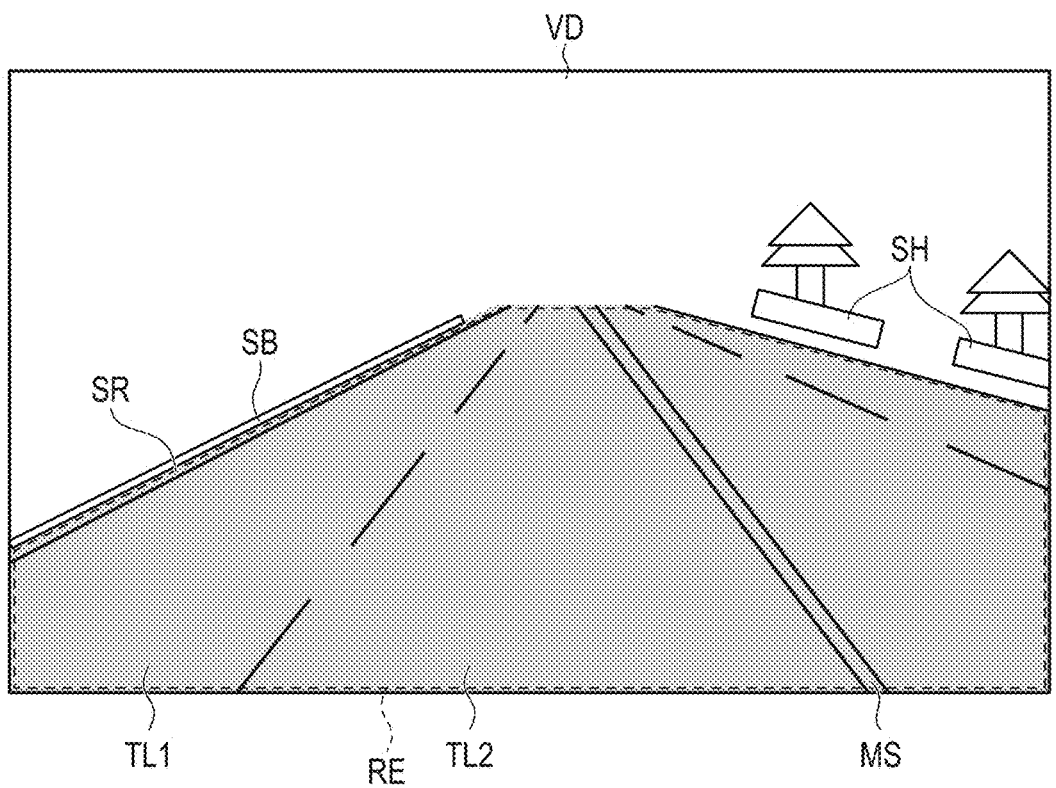
FIG. 12 is a diagram showing a second example of a result of extracting a diagram indicating a road region from the image data shown in FIG. 11.

FIG. 12 shows an example of displaying a shape indicating a road region of a road having two lanes on each side extracted by the road region extraction processing in a superimposed manner on an original image. In this example, a shape (shaded portion in the drawing) indicating a region RE including traveling lanes TL1 and TL2 in the upward and downward directions and a road shoulder SR on the left side is extracted. In this case, the road shoulder SR may include a curb SB.

However, in some cases, other vehicles traveling in the traveling lane TL1 on the road shoulder side may be seen in the image data. In this case, the side end portion of the traveling lane TL1 or the side end portion of the road shoulder SR is hidden by the other traveling vehicles, and the true side end portion of the road region may not be extracted. Therefore, the road region extraction unit 131 extracts the true road region in the following manner.

Figure 9:
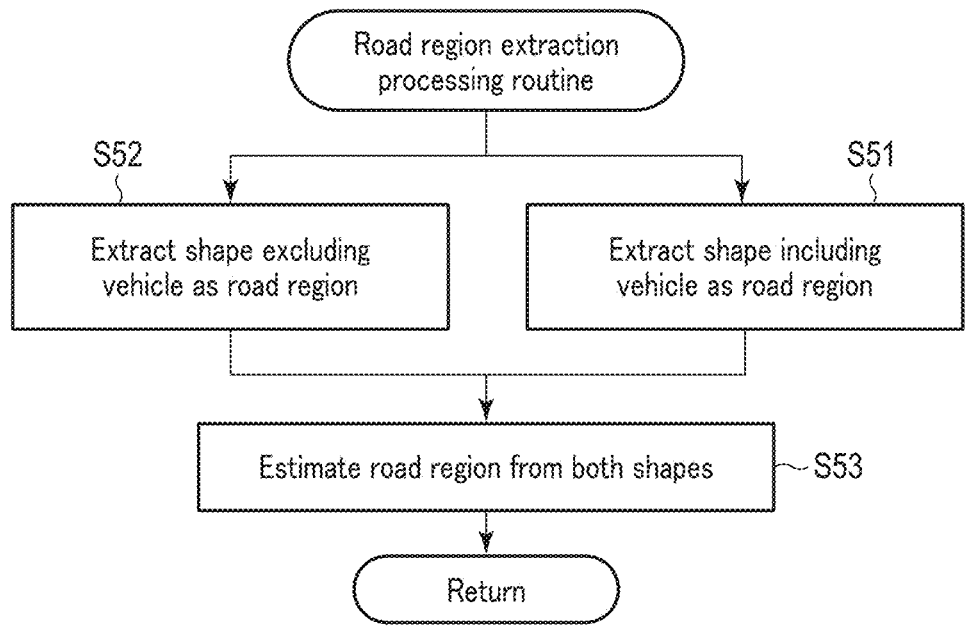
FIG. 9 is a flowchart showing a processing procedure and processing contents of a road region extraction processing routine in the lane estimation processing routine shown in FIG. 7.

FIG. 9 is a flowchart showing a processing procedure and processing contents of the road region extraction unit 131 in this case.

That is, in step S51, the road region extraction unit 131 extracts a shape indicating the entire region including the road region and the outer shapes of the other traveling vehicles based on the image of the road region extracted using the SegNet. At the same time, in step S52, a shape indicating a region excluding the traveling vehicles in the road region is extracted. In the processing of extracting the shapes indicating the respective regions in steps S51 and S52, processing of excluding an erroneously extracted region by using information such as the size of the area and processing of extracting a contour by smoothing the extracted road region, etc. are performed. In step S53, the road region extraction unit 131 estimates the true shape of the road region when it is assumed that there are no other traveling vehicles based on the shapes extracted in steps S51 and S52.

(2-2) Calculation of Feature Value and Lane Estimation Based on Feature Value

In step S32, the lane estimation processing unit 13 then, under the control of the feature value calculation unit 132, calculates the feature value from the shape indicating the extracted road region. Then, in step S33, under the control of the lane estimation unit 133, the lane estimation processing unit 13 estimates whether the vehicle 6 is currently traveling in the traveling lane TL1 on the road shoulder side or traveling in the traveling lane TL2 on the median strip side based on the calculated feature value.

A plurality of forms can be considered for the feature value used for the lane estimation. Hereinafter, an example of lane estimation processing in a case where each of the plurality of feature values is used will be explained.

Figure 13:
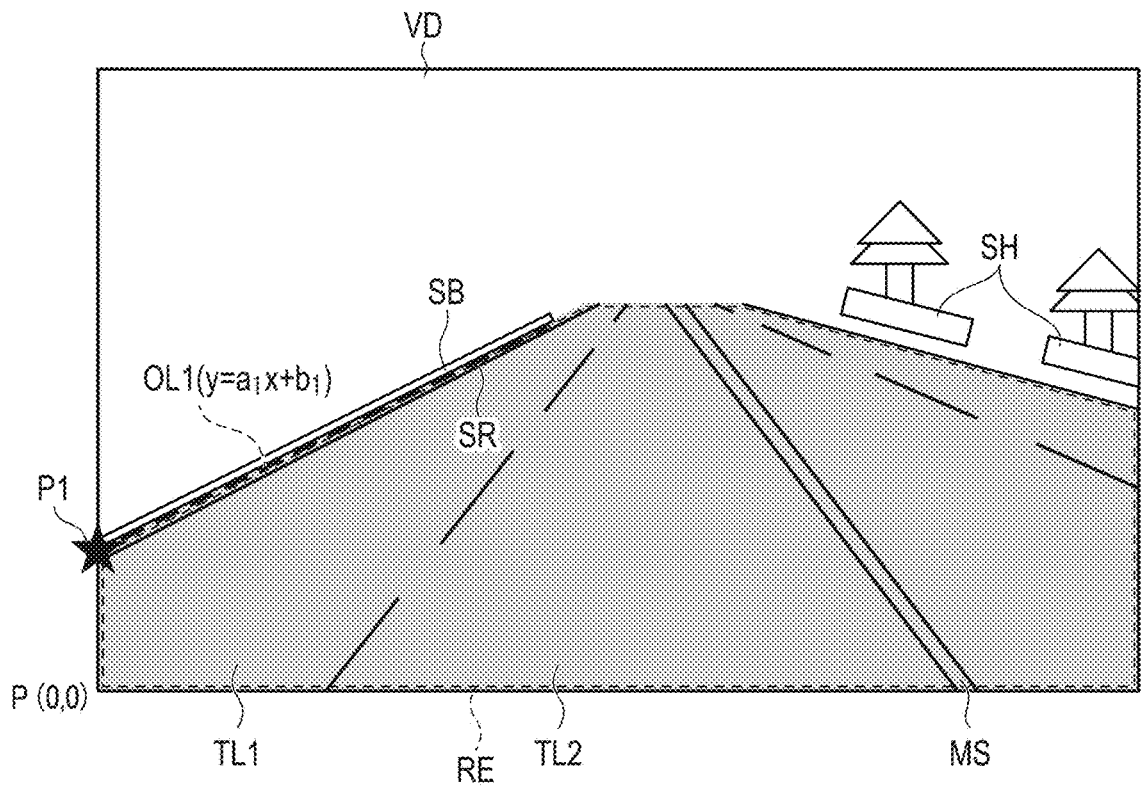
FIG. 13 is a diagram for explaining a first example of processing of estimating a traveling lane of a vehicle by calculating an inclination angle of a contour from the diagram shown in FIG. 12.

(2-2-1) A Case of Performing Lane Estimation Using an Inclination Angle of a Left End Side of a Road Region as the Feature Value For example, in a case where an image shown in FIG. 13 is obtained, the feature value calculation unit 132 draws an approximate line OL1 with respect to the left end side of the shape indicating the road region RE extracted by the road region extraction unit 131, that is, the left end portion of the traveling lane TL1 or the left end portion of the road shoulder SR. When a lower left corner of a screen configured by the image data is defined as a reference coordinate (0,0) on an x-y coordinate plane, the approximate line OL1 is expressed as:

$y = a_1 x + b_1$.

Here, $a_1$ indicates an inclination, and $b_1$ indicates an intercept with respect to point P1.

Figure 14:
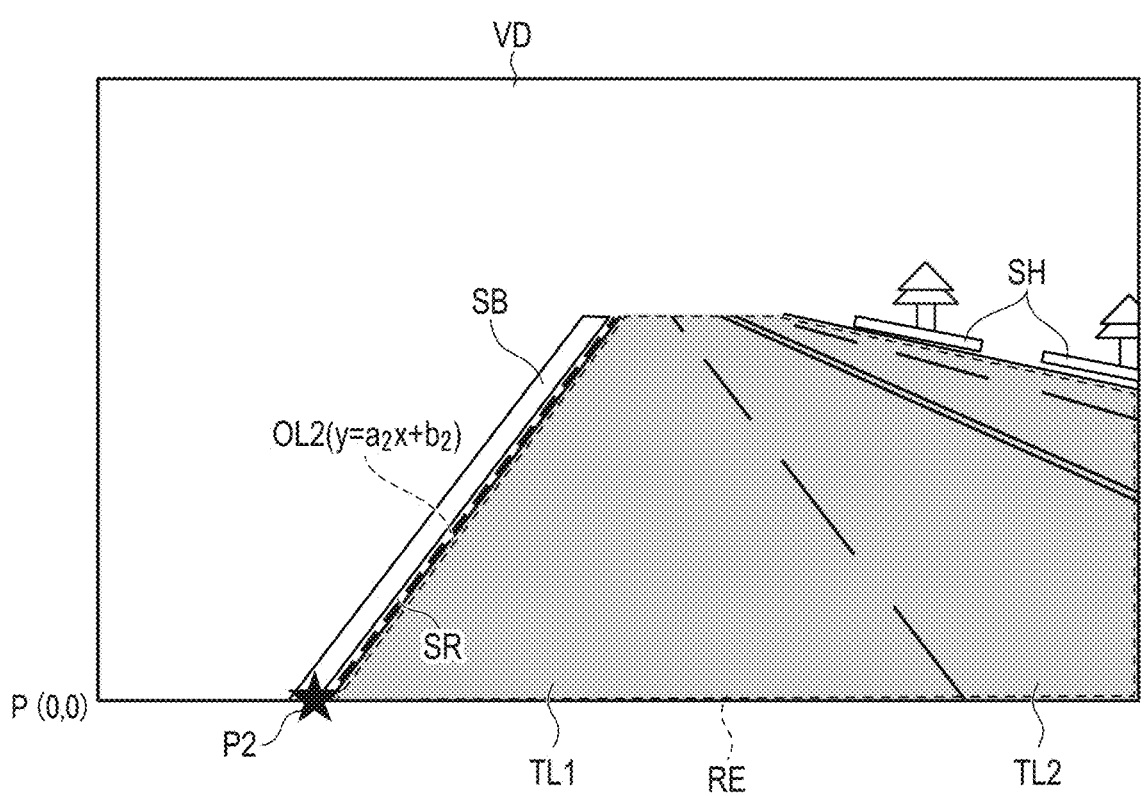
FIG. 14 is a diagram for explaining a second example of processing of estimating a traveling lane of a vehicle by calculating an inclination angle of a contour from the diagram shown in FIG. 12.

Similarly, for example, in a case where an image shown in FIG. 14 is obtained, the feature value calculation unit 132 draws an approximate line OL2 with respect to the left end side of the shape indicating the road region RE extracted by the road region extraction unit 131. Also in this case, when the lower left corner of the screen configured by the image data is defined as a reference coordinate (0,0) on an x-y coordinate plane, the approximate line OL2 is expressed by $$y = a_2 x + b_2$$

(where y is 0 when x is equal to or lower than P2).

In this way, the feature value calculation unit 132 calculates, as the feature value, inclination angles $a_1$ and $a_2$ of the left side contour line of the shape indicating the road region RE, that is, the left end portion of the traveling lane TL1 or the left end portion of the road shoulder SR.

Subsequently, in step S33, the lane estimation unit 133 reads out the threshold value of the inclination angle set in advance for each lane from the threshold value storage unit 25 of the data memory 20. Then, the inclination angles of the approximate lines OL1 and OL2 calculated by the feature value calculation unit 132 are compared with the respective threshold values set for the respective lanes, and it is determined whether the lane in which the vehicle 6 is currently traveling is the traveling lane TL1 on the road shoulder side or the traveling lane TL2 on the median strip side based on the comparison result.

For example, when the currently calculated feature value is the inclination angle $a_1$ of the approximate line OL1, as exemplified in FIG. 13, the inclination angle $a_1$ is included in the range of the threshold value corresponding to the traveling lane TL2, and thus it is determined that the lane in which the vehicle 6 is traveling is the traveling lane TL2 on the median strip side. On the other hand, when the calculated feature value is the inclination angle $a_2$ of the approximate line OL2, as exemplified in FIG. 14, the inclination angle $a_2$ is included in the range of the threshold value corresponding to the traveling lane TL1, and thus it is determined that the lane in which the vehicle 6 is traveling is the traveling lane TL1 on the road shoulder side.

(2-2-2) A Case of Performing Lane Estimation Using Center-of-Gravity of a Shape of a Road Region as the Feature Value The feature value calculation unit 132 cuts out a shape indicating a region corresponding to each lane on one side from the shape indicating the road region extracted by the road region extraction unit 131, and defines a diagram for feature value calculation in an arbitrary part of the cut out shape. Then, coordinates of the center-of-gravity of the diagram are calculated as a feature value.

Figure 15:
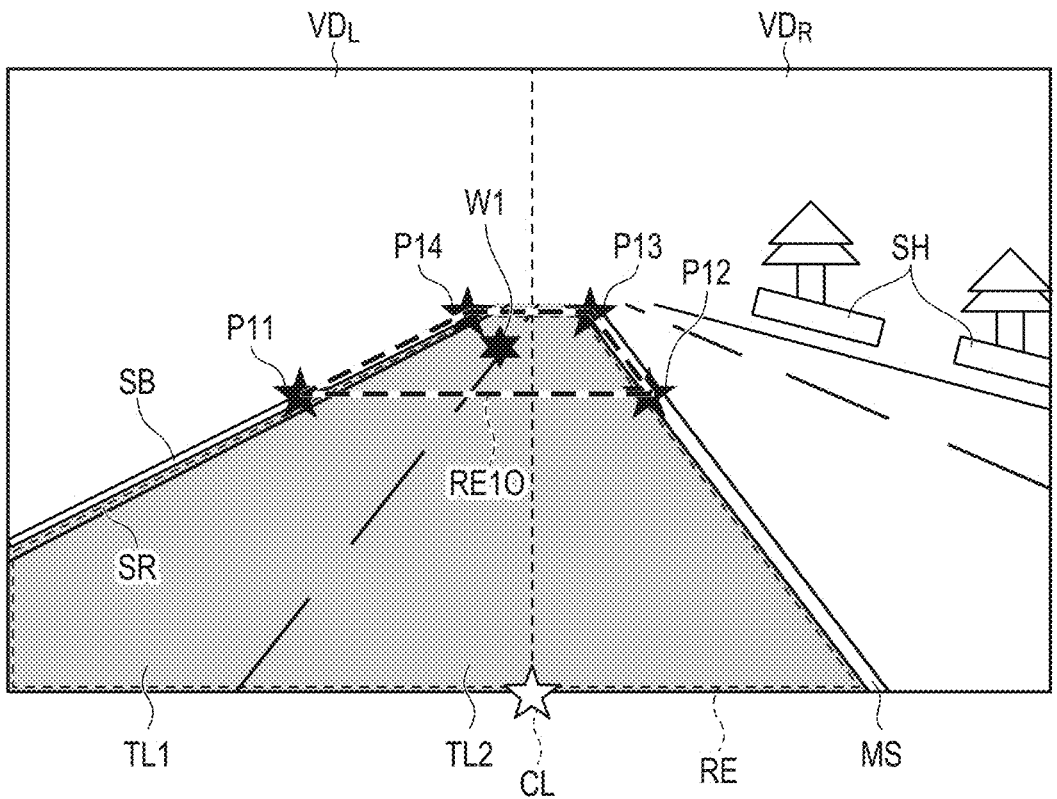
FIG. 15 is a diagram for explaining a first example of processing of estimating a traveling lane of a vehicle by calculating the center-of-gravity of a specific region from the diagram shown in FIG. 12.
Figure 16:
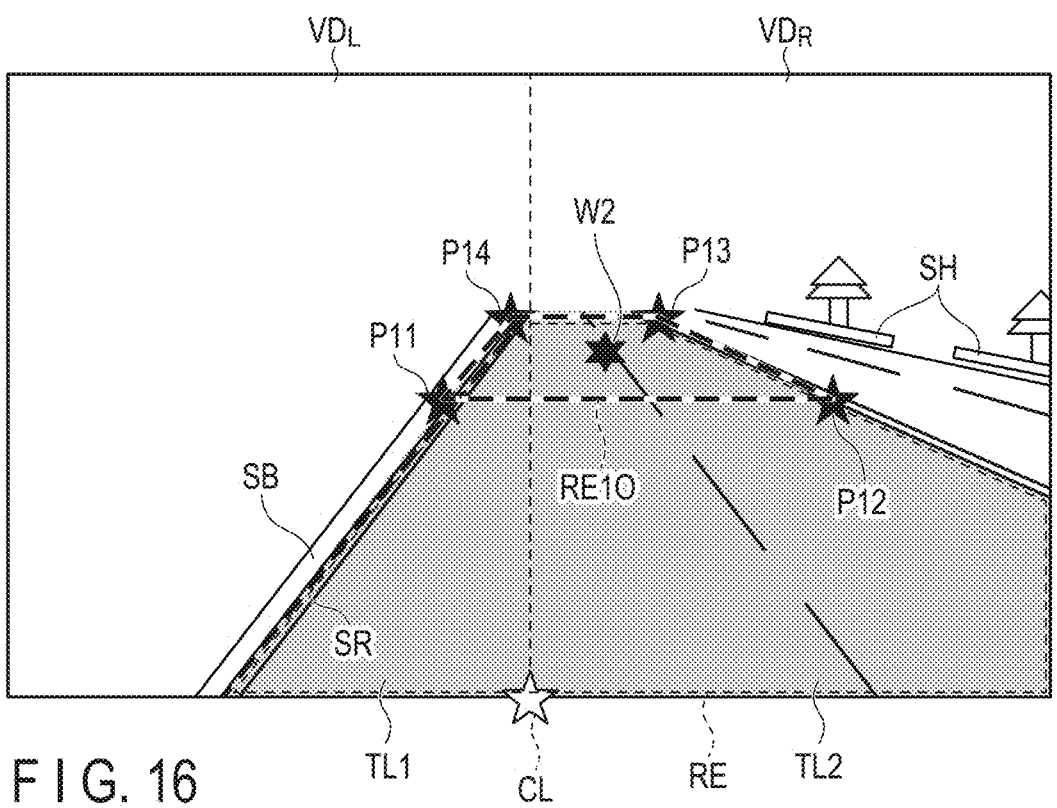
FIG. 16 is a diagram for explaining a second example of processing of estimating a traveling lane of a vehicle by calculating the center-of-gravity of a specific region from the diagram shown in FIG. 12.

For example, in the shape indicating the region RE corresponding to each lane on one side as shown in FIG. 15, a portion surrounded by coordinate points P11 to P14 is defined as a diagram RE10 for feature value calculation. Then, a coordinate W1 indicating the center-of-gravity of the diagram RE10 is calculated. Similarly, in the shape indicating the region RE corresponding to a lane on one side as shown in FIG. 16, a portion surrounded by coordinate points P11 to P14 is defined as a diagram RE20 for feature value calculation, and a coordinate W2 indicating the center-of-gravity of the diagram RE20 is calculated.

Subsequently, the lane estimation unit 133 reads out coordinate values indicating a center line CL dividing the image data into left and right parts from the threshold value storage unit 25 of the data memory 20. Then, by determining whether the coordinate indicating the center-of-gravity of the diagram RE20 calculated by the feature value calculation unit 132 is located on the left side or the right side of the coordinate value of the center line CL in the x-axis direction in the drawing, it is determined whether the lane in which the vehicle 6 is traveling is the traveling lane TL1 on the road shoulder side or the traveling lane TL2 on the median strip side.

For example, as shown in FIG. 15, in a case where the feature value is the center-of-gravity coordinate W1 of the diagram RE10, the center-of-gravity coordinate W1 is located on the left side of the coordinate value of the center line CL in the x-axis direction in the drawing, and thus the lane estimation unit 133 determines that the lane in which the vehicle 6 is traveling is the traveling lane TL2 on the median strip side. On the other hand, as shown in FIG. 16, in a case where the feature value is the center-of-gravity coordinate W2 of the diagram RE20, the center-of-gravity coordinate W2 is located on the right side of the coordinate value of the center line CL in the x-axis direction in the drawing, and thus it is determined that the lane in which the vehicle 6 is traveling is the traveling lane TL1 on the road shoulder side.

(2-2-3) a Case of Approximating a Shape of a Road Region with a Triangle, One Side of which is in a y-Axis Direction of Image Data, and Performing Lane Estimation Using an Angle or Area of the Triangle as the Feature Value The feature value calculation unit 132 extracts a shape included in a region on the left side with respect to the center line CL in the x-axis direction of the screen constituted by the image data from among the shapes indicating the road region RE extracted by the road region extraction unit 131. The extracted shape is then approximated by a right-angled triangle having the center line CL as one side, and an area of the right-angled triangle or an angle at one vertex is calculated as a feature value.

Figure 17:
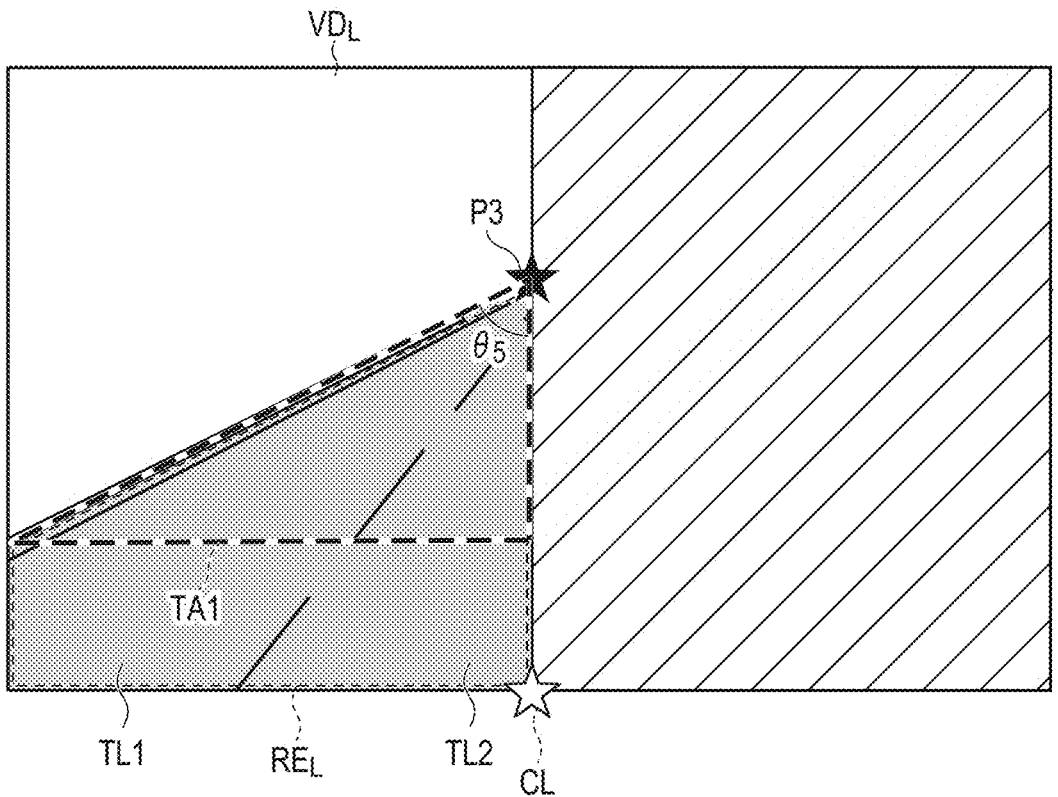
FIG. 17 is a diagram for explaining a first example of processing of estimating a traveling lane of a vehicle by calculating an area or angle of a triangle from the diagram shown in FIG. 12.

For example, in the example shown in FIG. 17, a shape (contour $RE_L$) included in a left half region $VD_L$ of the screen constituted by the image data is extracted from the shape indicating the road region RE, and this shape is approximated by a right-angled triangle TA1 having the center line CL as one side, and the area of the right-angled triangle TA1 or an angle $\theta_5$, which is an internal angle at a vertex P3, is calculated as the feature value.

Figure 18:
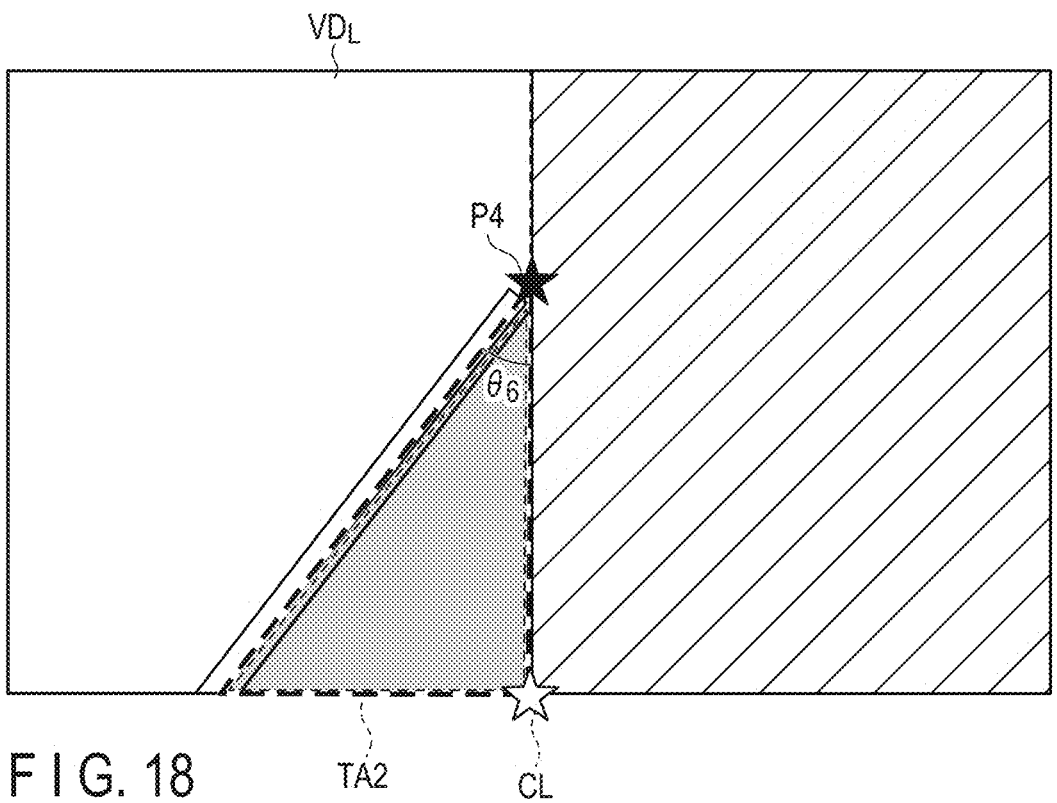
FIG. 18 is a diagram for explaining a second example of processing of estimating a traveling lane of a vehicle by calculating an area or angle of a triangle from the diagram shown in FIG. 12.

Similarly, in the example shown in FIG. 18, the shape included in the left half region $VD_L$ of the screen constituted by the image data is extracted, the shape is approximated by a right-angled triangle TA2 having the center line CL as one side, and the area of the right-angled triangle TA2 or an angle $\theta_6$ at a vertex P4 is calculated as the feature value. Instead of calculating the angle of the internal angle, an angle of an external angle of a vertex or an angle obtained by the internal angle+90° may be calculated.

Subsequently, the lane estimation unit 133 reads out the threshold value of the area or the threshold value of the angle of the right-angled triangle set in advance for each lane from the threshold value storage unit 25 of the data memory 20. The area or the angle of the right-angled triangle calculated by the feature value calculation unit 132 is compared with a preset threshold value of the area or the angle, respectively. Based on the comparison result, it is determined whether the lane in which the vehicle 6 is currently traveling is the traveling lane TL1 on the road shoulder side or the traveling lane TL2 on the median strip side.

For example, in the example shown in FIG. 17, since the angle $\theta_5$ of the vertex P3 of the right-angled triangle TA1 is larger than the angle threshold value, it is determined that the lane in which the vehicle 6 is traveling is the traveling lane TL2 on the median strip side. On the other hand, in the example shown in FIG. 18, since the angle $\theta_6$ of the vertex P4 of the right-angled triangle TA2 is equal to or smaller than the angle threshold value, it is determined that the lane in which the vehicle 6 is traveling is the traveling lane TL1 on the road shoulder side.

Instead of the angles $\theta_5$ and $\theta_6$ of the vertexes of the right-angled triangles, it is also possible to determine the lanes TL1 and TL2 by comparing the areas of the right-angled triangles TA1 and TA2 with a threshold value. The areas of the right-angled triangles TA1 and TA2 can be obtained, for example, by counting the number of pixels in regions surrounded by the contours of the right-angled triangles TA1 and TA2.

(2-2-4) A Case of Estimating a Lane by Using Angles $\theta$ Between a Lower Side Center Point of a Screen and Intersection Points of Two Parallel Horizontal Lines Drawn on the Screen Constituted by Image Data and Contour Lines of a Road Region as the Feature Values The feature value calculation unit 132 calculates intersections between both left and right edges of the shape indicating the road region extracted by the road region extraction unit 131 and two parallel horizontal lines set on the screen constituted by the image data. Then, an angle with respect to the lower side of the image data when a lower side center point Pc of the image data and each of the intersections are connected by a straight line is calculated, and the calculated angle is used as a feature value.

Figure 19:
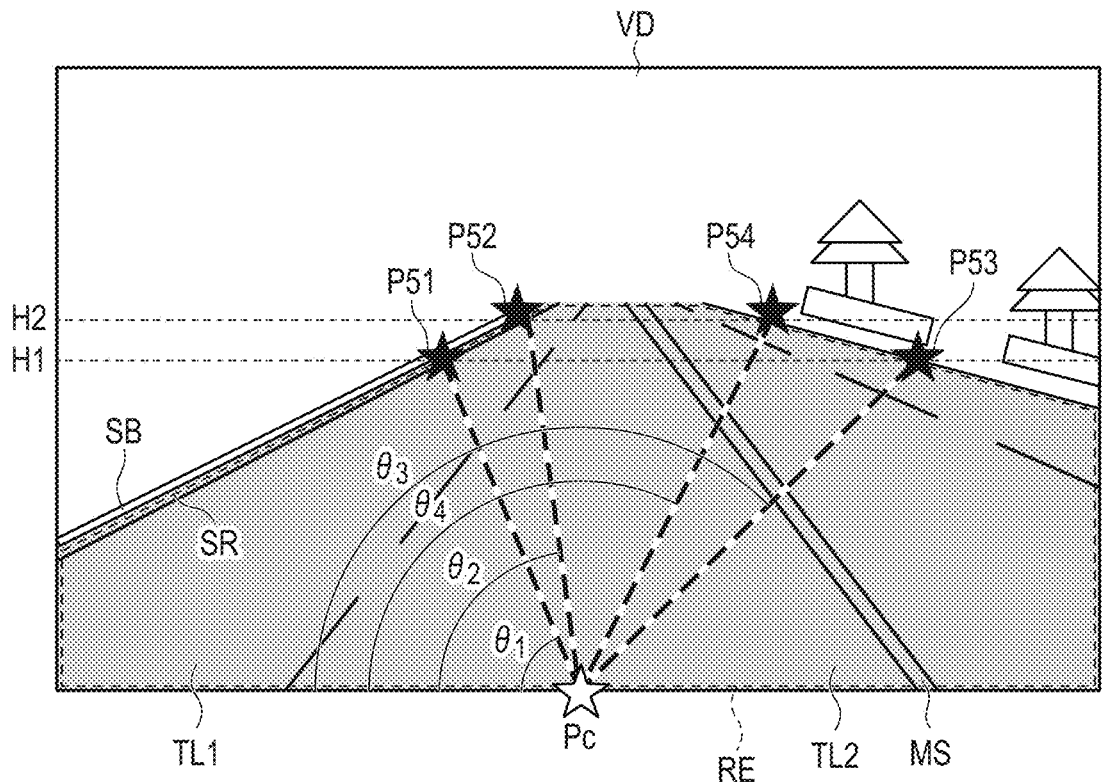
FIG. 19 is a diagram for explaining a first example of processing of estimating a lane in which a vehicle is traveling based on the angle when an arbitrary point on both sides of a road region is viewed from the vehicle.
Figure 20:
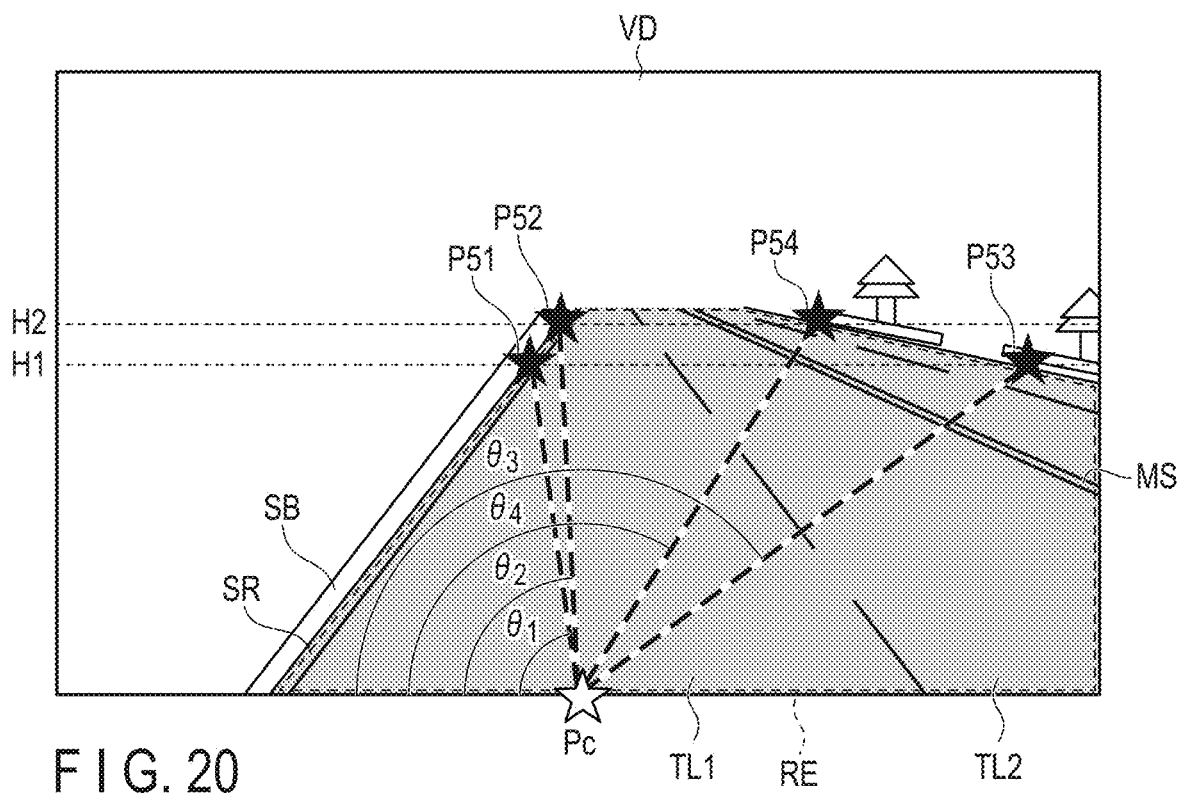
FIG. 20 is a diagram for explaining a second example of processing of estimating a lane in which a vehicle is traveling based on the angle when an arbitrary point on both sides of a road region is viewed from the vehicle.

For example, in the example shown in FIG. 19, intersections P51, P52, P53, and P54 of both left and right edges of the shape indicating the road region RE and two parallel horizontal lines H1 and H2 set on the screen constituted by the image data are detected. Then, angles $\theta_1$, $\theta_2$, $\theta_3$, and $\theta_4$ of each straight line connecting the lower side center point Pc of the screen constituted by the image data and the respective intersections P51, P52, P53, and P54 are calculated with respect to the lower side of the screen, and a difference between the calculated angles $\theta_1$ and $\theta_2$ and a difference between the calculated angles $\theta_3$ and $\theta_4$ are used as feature quantities. Also, in the example shown in FIG. 20, similarly, a difference between angles $\theta_1$ and $\theta_2$ and a difference between angles $\theta_3$ and $\theta_4$ of each straight line connecting the lower side center point Pc of the screen constituted by the image data and each intersection P51, P52, P53, and P54 are calculated as the feature values.

Subsequently, the lane estimation unit 133 reads out angle difference threshold values for the left side and for the right side set in advance for each lane from the threshold value storage unit 25 of the data memory 20. Then, the difference between the angles $\theta_1$ and $\theta_2$ and the difference between the angles $\theta_3$ and $\theta_4$ calculated by the feature value calculation unit 132 are compared with the angle difference threshold values for the left side and the right side set for each lane. Based on the comparison result, it is determined whether the lane in which the vehicle 6 is currently traveling is the traveling lane TL1 on the road shoulder side or the traveling lane TL2 on the median strip side.

For example, in the example shown in FIG. 19, if the difference between the angles $\theta_1$ and $\theta_2$ is larger than the threshold value for the left side and the difference between the angles $\theta_3$ and $\theta_4$ is equal to or smaller than the threshold value for the right side, it is determined that the lane in which the vehicle 6 is traveling is the traveling lane TL2 on the median strip side. Similarly, in the example shown in FIG. 20, if the difference between the angles $\theta_1$ and $\theta_2$ is equal to or smaller than the threshold value for the left side and the difference between the angles $\theta_3$ and $\theta_4$ is larger than the threshold value for the right side, it is determined that the lane in which the vehicle 6 is traveling is the traveling lane TL1 on the road shoulder side.

(2-2-5) A Case of Estimating a Traveling Lane Based on a Shape Indicating a Road Region Extracted when Another Traveling Vehicle is Present in the Traveling Lane As described above, the road region extraction unit 131 extracts the shape indicating the entire region including the road region and the other traveling vehicles in step S51, and extracts the shape indicating the region excluding the other traveling vehicles in the road region in step S52. In step S53, based on each of the extracted shapes, a shape indicating a road region when it is assumed that there are no other traveling vehicles is estimated.

Based on the shape indicating the road region estimated in step S53, the feature value calculation unit 132 draws an approximate line on the left end side thereof and calculates an inclination angle of the approximate line as a feature value.

Figure 21:
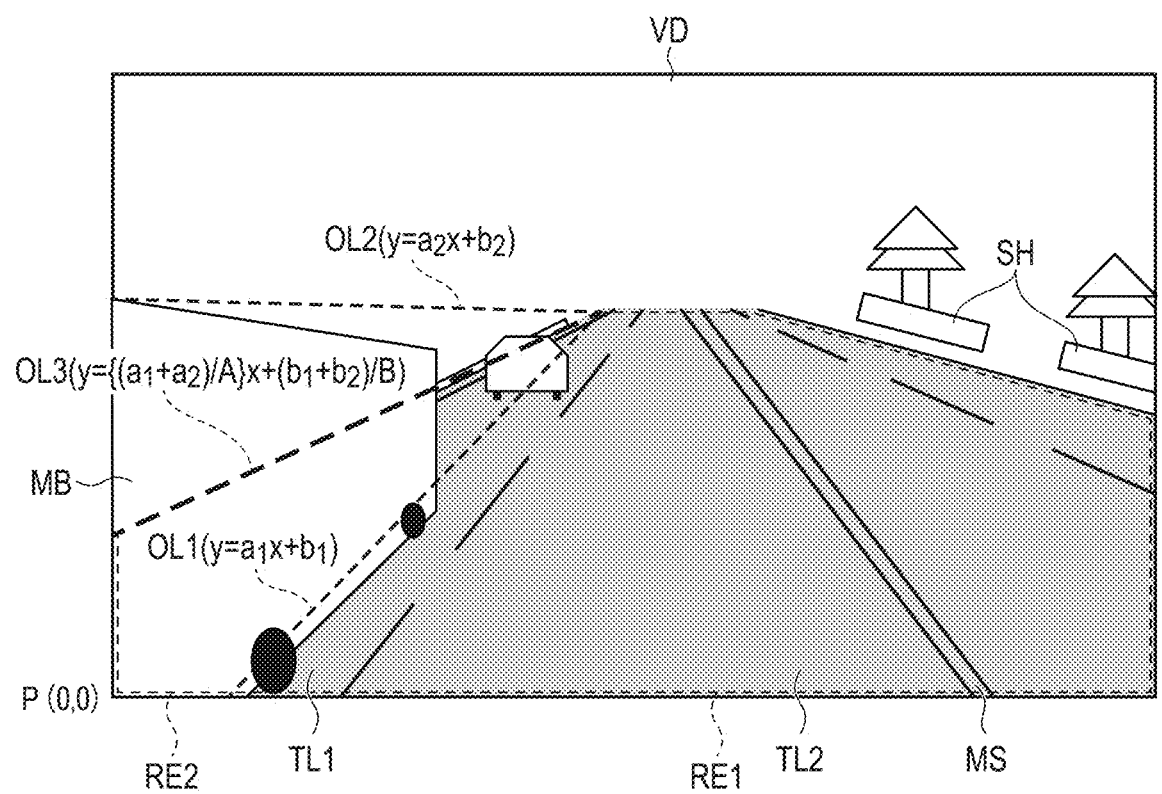
FIG. 21 is a diagram for explaining an example of a method of calculating a road region when a vehicle is traveling in another lane.

For example, in the example shown in FIG. 21, based on the shape indicating the entire region including an image MB of another traveling vehicle extracted in step S51, the feature value calculation unit 132 draws an approximate line OL2 on the left end side thereof. The approximate line OL2 is expressed by $$y = a_2 x + b_2.$$

At the same time, based on the shape indicating the region excluding the traveling vehicles in the road region extracted in step S52, the feature value calculation unit 132 draws an approximate line OL1 on the left end side thereof. The approximate line OL1 is expressed by $$y = a_1 x + b_1.$$

Then, based on each of the approximate lines OL1 and OL2, the feature value calculation unit 132 calculates a third approximate line OL3 that is between the approximate lines OL1 and OL2, and sets the third approximate line OL3 as a contour line of the left end side of the road region when it is assumed that the image MB of another traveling vehicle does not exist. In this case, the third approximate line OL3 is expressed by $$y = \{(a_1 + a_2)/A\} x + (b_1 + b_2)/B.$$

Here, A and B are coefficients, and are determined based on parameters such as how far the other traveling vehicle is traveling in the left-right direction from the center of the lane and how many meters of height the other traveling vehicle has. By appropriately setting these coefficients A and B, the position of the approximate line OL3 can be brought close to the position of the left end side of the actual road region.

The lane estimation unit 133 compares the calculated inclination angle $\{(a_1 + a_2)/A\}$ of the approximate line OL3 with a threshold value set in advance for each lane. Based on the comparison result, it is determined whether the lane in which the vehicle 6 is currently traveling is the traveling lane TL1 on the road shoulder side or the traveling lane TL2 on the median strip side.

For example, in the example shown in FIG. 21, since the inclination angle $\{(a_1 + a_2)/A\}$ is included in the range of the threshold value corresponding to the traveling lane TL2, it is determined that the lane in which the vehicle 6 is traveling is the traveling lane TL2 on the median strip side. On the other hand, when the inclination angle $\{(a_1 + a_2)/A\}$ is included in the range of the threshold value corresponding to the traveling lane TL1, it is determined that the lane in which the vehicle 6 is traveling is the traveling lane TL1 on the road shoulder side.

(3) Correction of Lane Estimation Result

In step S4 shown in FIG. 5, the control unit 10 of the lane estimation device 1 determines the accuracy (validity) of the lane estimated by the lane estimation processing unit 13 under the control of the lane correction unit 14, and executes processing of correcting the estimation result of the lane when it is determined that the lane is not valid.

Figure 8:
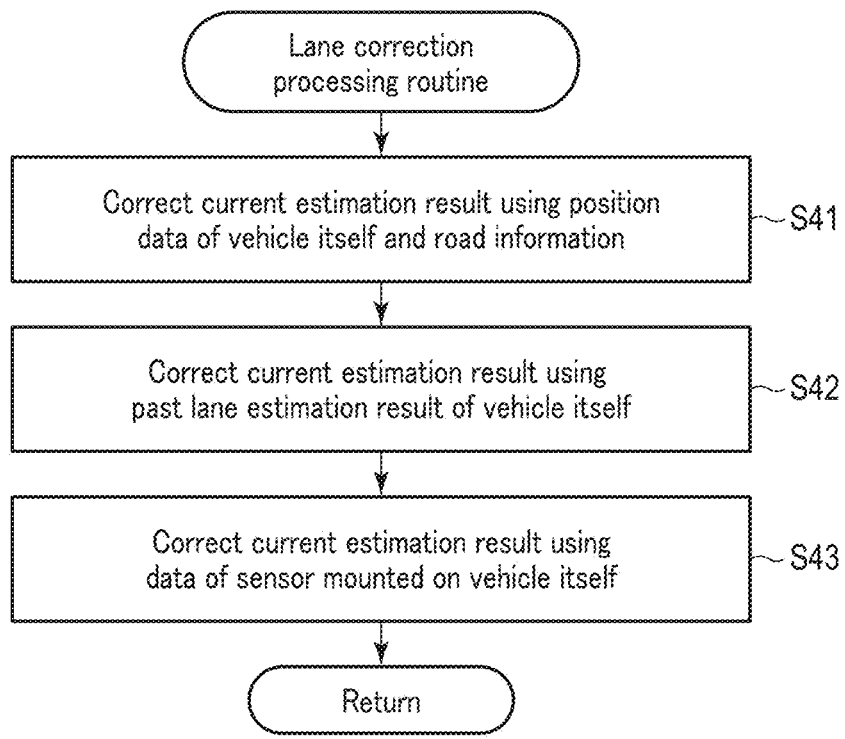
FIG. 8 is a flowchart showing a processing procedure and processing contents of a lane correction processing routine shown in FIG. 5.

FIG. 8 is a flowchart showing a processing procedure and processing contents of the lane correction unit 14.

(3-1) Correction Based on Information Indicating Road Configuration

First, in step S41, the lane correction unit 14 corrects the lane estimation result based on information indicating the configuration of the road corresponding to the traveling position of the vehicle 6. For example, in the road information acquisition unit 16, based on the current position data of the vehicle 6 measured by the GPS sensor 3, information indicating the configuration of the road corresponding to the position where the vehicle 6 is currently traveling is read out from the road information storage unit 23. The lane correction unit 14 collates the lane estimation result obtained by the lane estimation processing unit 13 with the read out information indicating the road configuration, and determines whether the lane estimation result is correct.

For example, when the lane estimation result is the "traveling lane TL2" on the median strip side, and the road on which the vehicle 6 is traveling is a road with one lane on each side, the lane estimation result is determined to be erroneous, and the lane estimation result is corrected to the "traveling lane TL1".

(3-2) Correction Based on Past Lane Change History

When a new lane estimation result is obtained, the past estimation data acquisition unit 15 reads out the past lane estimation data from the lane estimation data storage unit 22 and, based on the data, estimates the change history and tendency of the lane in which the vehicle 6 has traveled in a certain period in the past. The estimation processing may, for example, calculate the number of times or the frequency at which each of the traveling lanes TL1 and TL2 was used, or, for example, create trained data indicating the traveling tendency of a driver based on a traveling time zone, a traveling route, and a traveling position for each driver in advance and estimate a lane in which the driver is currently traveling based on the trained data.

In step S42, the lane correction unit 14 compares the latest lane estimation result obtained by the lane estimation processing unit 13 with the information indicating the lane change history or tendency of the vehicle 6 estimated by the past estimation data acquisition unit 15 to evaluate the validity of the latest lane estimation result. If, for example, the latest lane estimation result is the "traveling lane TL2" on the median strip side even though the driver travels only in the traveling lane TL1 on a daily basis, the estimation result is determined to be erroneous, and the lane estimation result is corrected to the "traveling lane TL1" on the road shoulder side.

(3-3) Correction Based on Movement State of Vehicle 6 and the Past Lane Change History The vehicle action state estimation unit 18 estimates whether or not the vehicle 6 has made a lane change based on the sensor data indicating the movement of the vehicle 6 such as the speed and acceleration of the vehicle 6 and the steering wheel operation angle, etc. acquired by the vehicle sensor data acquisition unit 17.

In step S43, the lane correction unit 14 compares the lane estimation result obtained by the lane estimation processing unit 13 and the estimation result of the lane change obtained by the vehicle action state estimation unit 18 with each other in terms of time. If the lane estimation result obtained by the lane estimation processing unit 13 does not correspond to the estimation result of the lane change obtained by the vehicle action state estimation unit 18, the lane estimation result obtained by the lane estimation processing unit 13 is corrected based on the estimation result of the lane change obtained by the vehicle action state estimation unit 18.

Finally, the lane correction unit 14 stores the data of the latest lane estimation result corrected by each correction processing described above in the lane estimation data storage unit 22 in association with the information indicating the current time.

In the lane correction processing described above, a case of executing all of the three types of correction processing (3-1), (3-2), and (3-3) has been described as an example. However, only one or two types arbitrarily selected from the three types of correction processing may be executed, and the correction processing may be omitted when correction is not necessary. The order of executing the three types of correction processing may be set in the following manner.

(4) Output of Lane Estimation Data

Under the control of the estimation data output control unit 19, in step S5, the control unit 10 executes control for outputting the lane estimation result in the following manner.

That is, each time the latest lane estimation data is stored in the lane estimation data storage unit 22, the estimation data output control unit 19 reads out the lane estimation data from the lane estimation data storage unit 22. Then, the lane estimation data is output from the input/output I/F 30 to the autonomous driving controller 5. As a result, in the autonomous driving controller 5, for example, control for maintaining or changing the traveling position of the vehicle is performed by using the lane estimation data as one of the pieces of data indicating the current traveling state of the vehicle 6.

The estimation data output control unit 19 generates, for example, display data for displaying the position of the lane in which the vehicle 6 is traveling on map data in a superimposed manner based on the latest lane estimation data, and outputs the display data from the input/output I/F 30 to, for example, a car navigation device. As a result, in the car navigation device, processing to display the display data on a display unit is performed, whereby, on the display unit of the car navigation device, the position of the lane in which the vehicle 6 itself is currently traveling is displayed on the map.

(Effect)

As described above in detail, in the first embodiment, the shape indicating the road region is extracted from the image data obtained by imaging the progression direction of the vehicle 6, and, based on the information indicating the shape, the inclination angle for one contour line, the center-of-gravity coordinate for a diagram indicating the shape of the road region, the angle between two consecutive contour lines across one vertex of the diagram indicating the shape, and the area of the diagram indicating the shape are calculated as the feature values for the shape of the road region. By determining whether or not the calculated feature value is included in a range of a threshold value set in advance for each lane, the lane in which the vehicle 6 is traveling is estimated.

Therefore, according to the first embodiment, it is possible to estimate the lane by focusing on the feature of the shape indicating the road region when the traveling direction is viewed from the vehicle 6. Therefore, it is possible to estimate the lane in which the vehicle is traveling without depending on the lane marker that divides the lane on the road. Accordingly, it is possible to estimate the lane even in a case where, for example, a repair mark of the lane marker remains due to construction or the like or fades or disappears due to deterioration over time.

In the first embodiment, in a case where an object such as another traveling vehicle is present in a road region, a shape indicating the entire road region including the object and a shape indicating a region of the road region excluding the object are extracted from image data, and a contour line of the road region when it is assumed that the object is not present is estimated based on the extracted shapes. The lane in which the vehicle 6 is traveling is estimated based on the estimated inclination angle of the contour line. Therefore, for example, even in a case where the road shoulder or the left end portion of the traveling lane is hidden by another vehicle traveling in the lane on the road shoulder side, it is possible to estimate the contour line of the road shoulder or the left end portion of the traveling lane, to estimate the lane based on the estimation result.

Furthermore, in the first embodiment, the validity of the lane estimation result obtained by the lane estimation processing unit 13 is evaluated based on the information indicating the configuration of the road corresponding to the traveling position of the vehicle 6, the past lane change history, and the information indicating the presence or absence of the lane change of the vehicle 6 estimated based on the sensor data indicating the movement of the vehicle 6, and the lane estimation result is corrected in the case where it is determined to be invalid. Therefore, for example, even in a case where clear image data cannot be obtained or a road region cannot be accurately recognized from the image data due to the influence of weather, illuminance, or the like, it is possible to correct the estimation result of the lane in which the vehicle is currently moving, and thereby to obtain an accurate lane estimation result.

Second Embodiment

A lane estimation device, method, and program according to a second embodiment of the present invention use pixel value data obtained by labeling each pixel in a road region based on a shape indicating the road region as a feature value of the road region. The lane estimation device, method, and program according to the second embodiment estimate the lane in which a vehicle 6 is moving by determining which of a plurality of patterns preset for each road or each lane the pixel value data is similar to.

The lane estimation device according to the second embodiment of the present invention can adopt the same configuration as the lane estimation device 1 explained in relation to the first embodiment. Therefore, in the following, the second embodiment will be explained by using the same reference numerals for the same configurations as those of the first embodiment, and detailed explanations overlapping with the first embodiment will be omitted.

(Configuration)

An on-vehicle system including a lane estimation device 1 according to the second embodiment of the present invention can adopt the same configuration as that described with reference to FIG. 1.

The lane estimation device 1 according to the second embodiment can adopt the same hardware configuration as that described with reference to FIG. 2.

Figure 22:
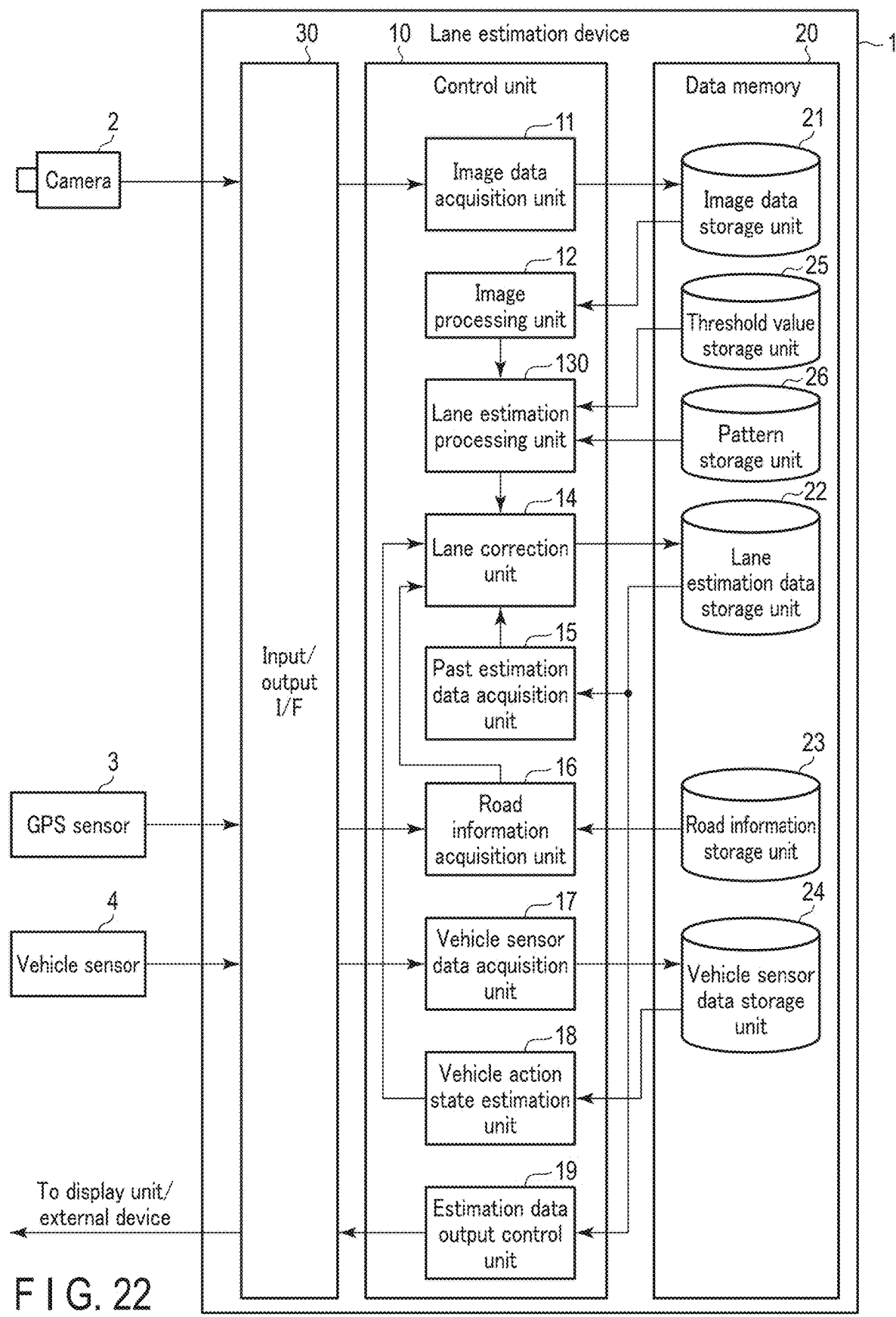
FIG. 22 is a block diagram showing a software configuration of a lane estimation apparatus according to a second embodiment of the present invention.

FIG. 22 is a block diagram showing a software configuration of the lane estimating device 1 according to the second embodiment of the present invention in association with the hardware configuration shown in FIG. 2.

Similarly to the first embodiment, a storage region of a data memory 20 includes an image data storage unit 21, a lane estimation data storage unit 22, a road information storage unit 23, a vehicle sensor data storage unit 24, and a threshold value storage unit 25. In the lane estimation device 1 according to the second embodiment, the storage region of the data memory 20 further includes a pattern storage unit 26.

The pattern storage unit 26 is used to store a pattern (hereinafter, referred to as a "region pattern", and various region patterns are collectively referred to as a "region pattern PT") corresponding to a shape of a road region which is set in advance for each road or each lane and is shown in an image. The region pattern PT indicates an ideal shape of a road region in which, if the vehicle 6 is traveling in the center of each lane, the road will appear in the image captured by the camera installed in the vehicle 6.

The region pattern PT is created or set based on image data collected in advance from a large number of vehicles by, for example, a road management server or the like that provides a traffic congestion prediction service. The lane estimation device 1 can acquire a set of patterns including a plurality of region patterns PT corresponding to the type (vehicle type, vehicle height, and the like) of the vehicle 6 from the server through the network via, for example, a communication unit (not shown), and store the set of patterns in the pattern storage unit 26. Here, depending on where the camera is installed in the vehicle 6, the shape of the road shown in the image captured by the camera greatly differs. Therefore, the lane estimation device 1 may appropriately correct the acquired region pattern PT according to the installation position of the camera, such as whether the camera is located at the center of the vehicle 6 or is deviated to the left or right, the distance of the camera to the center line of the vehicle 6, and the installation height of the camera based on the road, or the appearance of the hood of the vehicle itself shown in the image, then, store the corrected region pattern PT in the pattern storage unit 26. Alternatively, the lane estimation device 1 may transmit an image captured in advance by an on-vehicle camera to the server and receive a set of region patterns PT corrected by the server based on the image. Alternatively, the lane estimation device 1 itself may generate a set of region patterns PT corresponding to the installation position of the camera.

The pattern storage unit 26 stores, as a set of patterns corresponding to the types of the vehicles 6, a large number of region patterns PT that differ depending on the types of roads (for example, a national expressway, national highways, a prefectural road, a municipal road, and the like), the number of lanes (which lane of the road with what number of lanes the vehicles 6 are traveling in), and the like. For example, the pattern storage unit 26 stores each region pattern PT in association with position information so that a necessary region pattern PT can be retrieved based on position data of the vehicle 6 detected by a GPS sensor 3.

As in the first embodiment, a control unit 10 includes an image data acquisition unit 11, an image processing unit 12, a lane correction unit 14, a past estimation data acquisition unit 15, a road information acquisition unit 16, a vehicle sensor data acquisition unit 17, a vehicle action state estimation unit 18, and an estimation data output control unit 19. The control unit 10 according to the second embodiment includes a lane estimation processing unit 130 instead of the lane estimation processing unit 13.

Similarly to the lane estimation processing unit 13 described in the first embodiment, the lane estimation processing unit 130 receives pre-processed image data from the image processing unit 12 and performs processing of estimating the lane in which the vehicle 6 is traveling on the basis of the image data. However, the feature value and the detailed function to be used in the estimation processing is different from the lane estimation processing unit 13.

FIG. 23 shows an example of functions of the lane estimation processing unit 130. The lane estimation processing unit 130 includes a road region extraction unit 131, a pattern acquisition unit 1301, a similarity determination unit 1302, and a lane estimation unit 1303.

The road region extraction unit 131 performs the following processing.

(1) Processing of extracting a range corresponding to a road region and a region of an object present on the road (a vehicle region in this embodiment) from the image data received from the image processing unit 12.

(2) Processing of excluding a region erroneously extracted as a road region or a vehicle region by using information such as the size of the area of the region, and, furthermore, performing smoothing, etc. on the extracted road region and vehicle region to extract a shape indicating the road region and vehicle region.

The pattern acquisition unit 1301 performs processing of reading out the region pattern PT stored in the pattern storage unit 26 and passing the region pattern PT to the similarity determination unit 1302.

The similarity determination unit 1302 serves as a feature value calculation unit and, based on the shape indicating the road region extracted by the road region extraction unit 131, performs processing of acquiring pixel value data including a pixel value obtained by labeling each pixel in the road region as a feature value of the road region. The similarity determination unit 1302 further determines the similarity to the region pattern PT acquired by the pattern acquisition unit 1301 based on the acquired pixel value data, and passes the determination result to the lane estimation unit 1302.

The lane estimation unit 1303 serves as an estimation processing unit and performs processing of estimating which lane the vehicle 6 is currently traveling in based on the determination result by the similarity determination unit 1302.

(Operation)

A lane estimation operation by the lane estimation device 1 according to the second embodiment configured in the above manner will be described.

The lane estimation operation can follow the same flowchart as the overall processing procedure of the lane estimation processing by the control unit 10 described with reference to FIG. 5 in relation to the first embodiment.

(1) Image Data Acquisition and Image Processing

In step S1, the control unit 10 of the lane estimation device 1 executes image data acquisition processing under the control of the image data acquisition unit 11, as in the first embodiment. In step S2, the control unit 10 of the lane estimation device 1 executes image processing necessary for lane estimation with respect to the acquired image data under the control of the image processing unit 12, as in the first embodiment. The processing procedure and processing contents of the image processing unit 12 may be the same as those described in relation to FIG. 6.

Figure 25A:
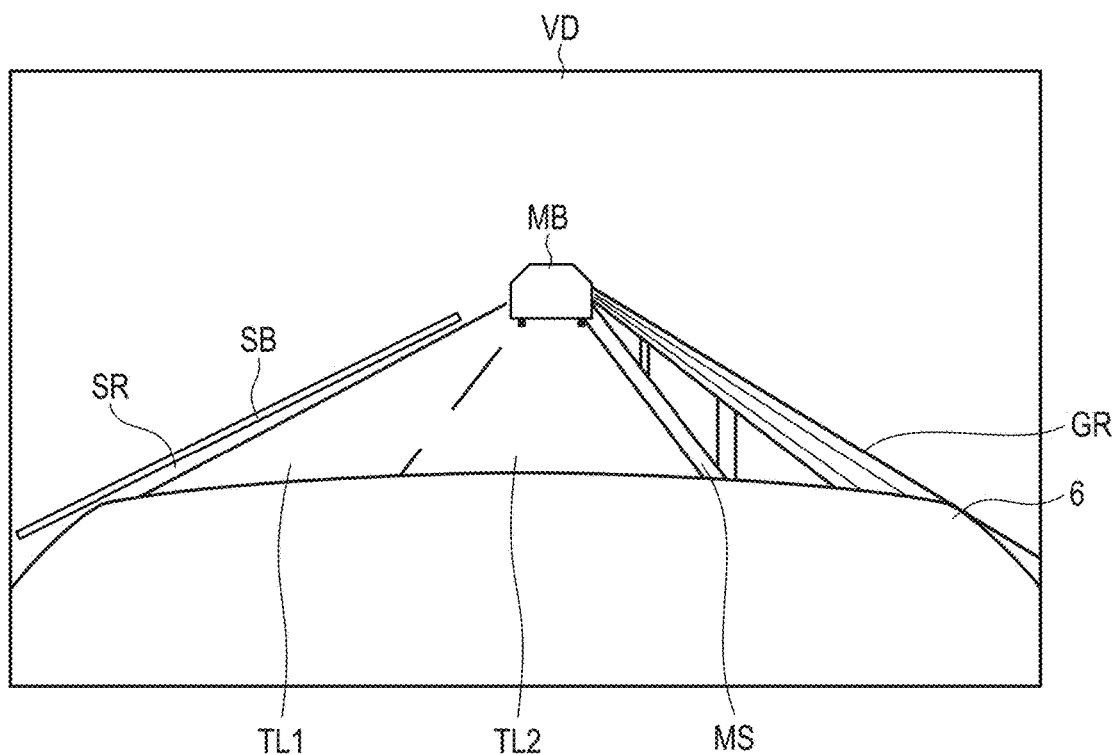
FIG. 25A is a diagram showing a second example of image data of a road obtained when a progression direction is imaged by an on-vehicle camera.

FIG. 25A shows a second example of still-image data VD after the image processing. In this example, an image is imaged by a camera 2 mounted on a vehicle 6 traveling on a road having two lanes on each side as shown in, for example, FIG. 10. In the still-image data VD of FIG. 25A, a hood portion of the vehicle 6 itself, a median strip MS, a guardrail RL on the median strip MS, traveling lanes TL1 and TL2, a road shoulder SR and curb SB, and another vehicle MB traveling ahead are shown.

(2) Estimation of Traveling Lane

In step S3, the control unit 10 of the lane estimation device 1 according to the second embodiment executes processing of estimating a lane in which the vehicle 6 is traveling in the following manner under the control of the lane estimation processing unit 130.

Figure 24:
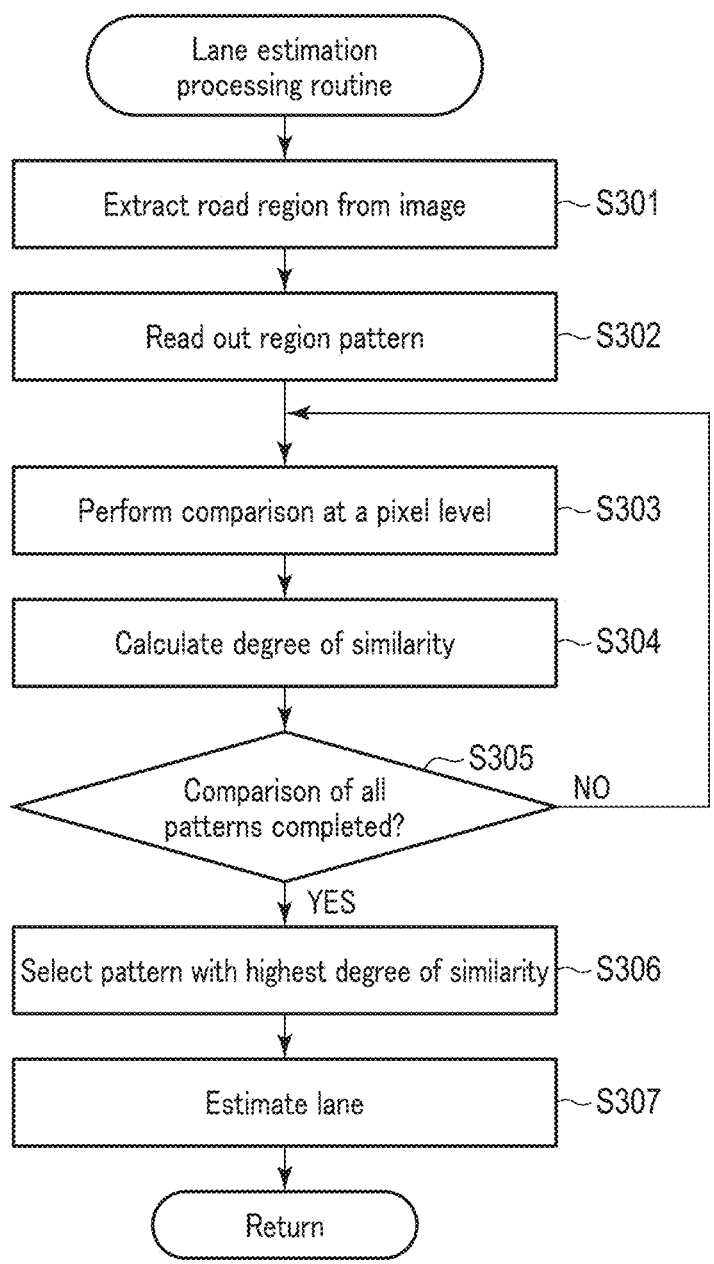
FIG. 24 is a flowchart showing a processing procedure and processing contents of a lane estimation processing routine by the lane estimation processing unit shown in FIG. 23.

FIG. 24 is a flowchart showing a processing procedure and processing contents of the lane estimation processing unit 130.

(2-1) Road Region Extraction

First, in step S301, the lane estimation processing unit 130 causes the road region extraction unit 131 to perform processing of extracting a road region from the pre-processed image data VD.

For the road having two lanes on each side as described above, the road region extraction unit 131 extracts a region including, for example, the traveling lanes TL1 and TL2 and the road shoulder SR as the road region. As in the first embodiment, the road region extraction unit 131 may extract only the traveling lanes TL1 and TL2 as the road region.

As in the first embodiment, SegNet is used as an example of the road region extraction processing means. Optionally, similarly to the first embodiment, the road region extraction unit 131 may perform processing of excluding an erroneously detected region using information such as the size of the area of the region in consideration of a case where there is a region erroneously extracted as a road region, and may further perform processing such as smoothing on the extracted road region to extract a shape indicating the road region.

Figure 25B:
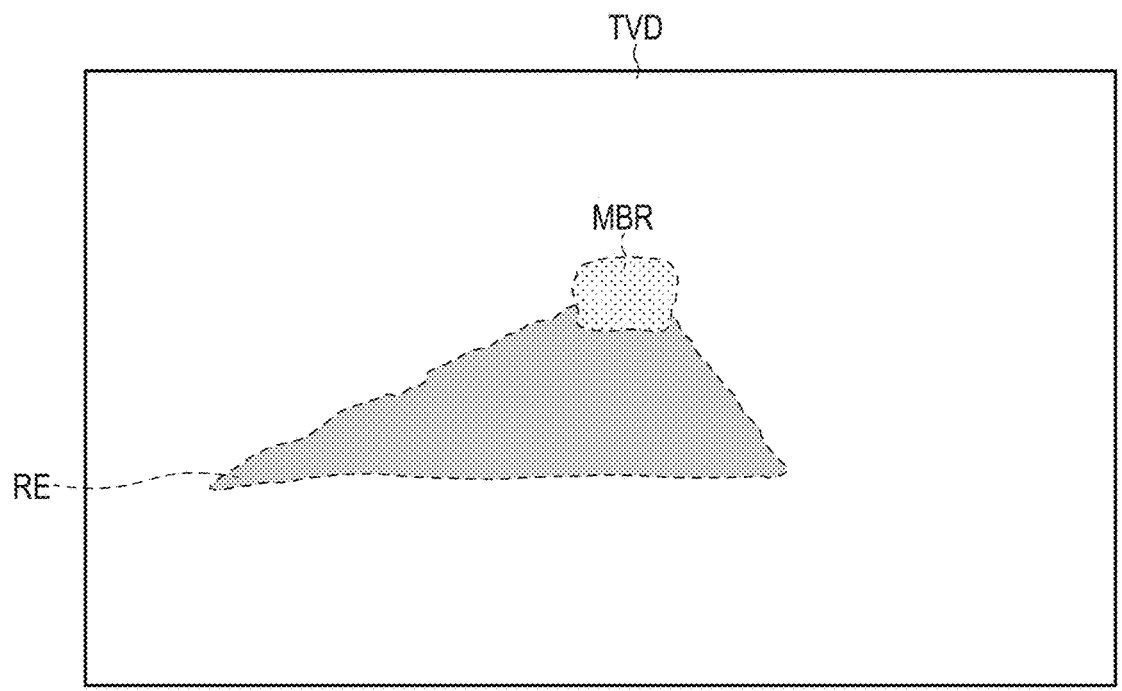
FIG. 25B is a diagram showing a second example of a result of extracting a diagram indicating a road region from the image data shown in FIG. 25A.

FIG. 25B shows an example of an output result obtained by performing the SegNet extraction processing on the image data VD shown in FIG. 25A. In FIG. 25B, in processed image data TVD, a shape (a shaded portion in the drawing) indicating a road region RE including traveling lanes TL1 and TL2 in the same traveling direction as the vehicle 6 itself and a left-side road shoulder SR and a shape (a dot-hatched portion in the drawing) indicating a region MBR including another vehicle MB traveling ahead are extracted. Each region is given a color corresponding to labeling on a pixel basis. In the following description, as an example, the road region RE is labeled with green ([R, G, B]=[0, 255, 0]), the vehicle region MBR is labeled with red ([R, G, B]=[255, 0, 0]), and the other region (colorless in the drawing) is labeled with black ([R, G, B]=[0, 0, 0]).

In the case where another vehicle appears in the image data and the road region cannot be extracted due to the other vehicle, the road region extraction unit 131 may perform the road region extraction processing shown in FIG. 9 as described in the first embodiment.

(2-2) Reading Out Region Pattern

Under the control of the pattern acquisition unit 1301, in step 302, the lane estimation processing unit 130 performs processing of reading out the region pattern PT set in advance for each type of road, each road, or each lane from the pattern storage unit 26 and passing the region pattern PT to the similarity determination unit 1302. For example, based on the position information of the vehicle 6 detected by the GPS sensor 3, the pattern acquisition unit 1301 reads out one or more region patterns PT corresponding to the position information from the pattern storage unit 26 and passes the region pattern PT to the similarity determination unit 1302.

Figure 26A:
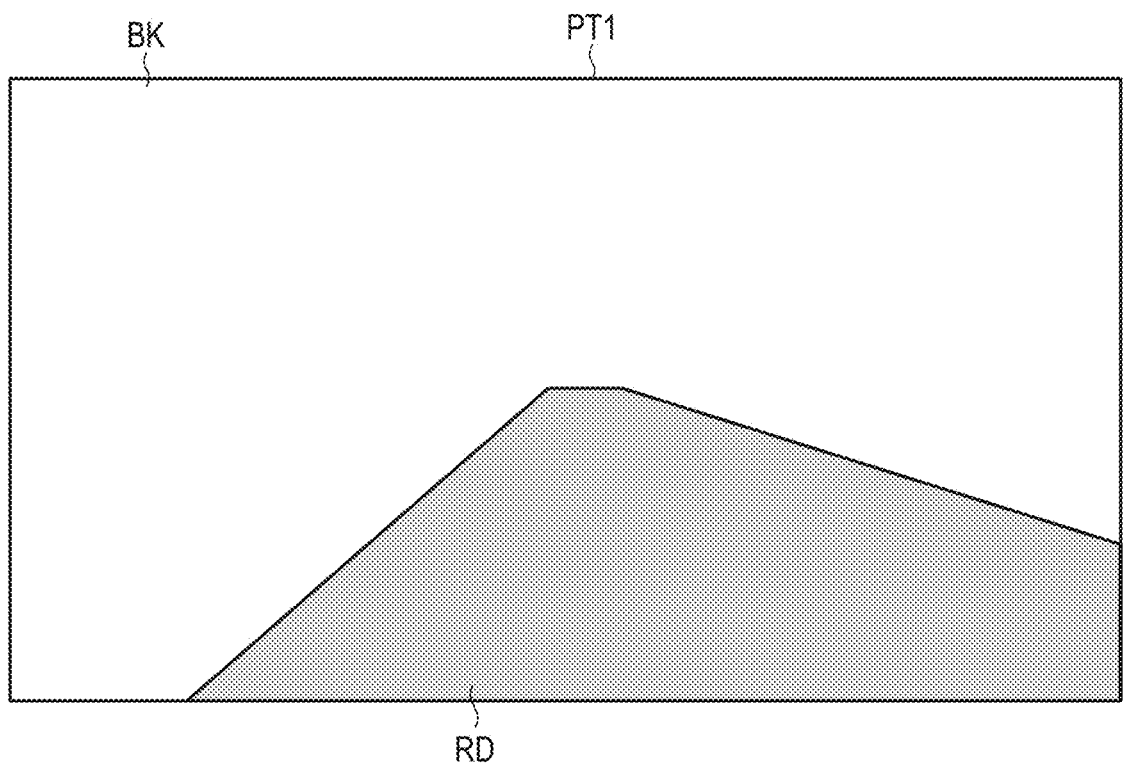
FIG. 26A is a diagram showing a first example of a region pattern.

FIG. 26A shows a region pattern PT1 set for each road, as an example of the region pattern PT read out from the pattern storage unit 26. The region pattern PT1 shown in FIG. 26A is set particularly for a national highway having two lanes on each side, and indicates a pattern relating to a road region shown in the image data acquired by a vehicle 6 traveling in a lane on the road shoulder side (left side). The region pattern PT1 includes a road portion RD (shaded portion) and a portion BK (colorless portion) other than the road portion RD. In the following description, as an example, a green pixel value ([R, G, B]=[0, 255, 0]) is assigned to the road portion RD, and a black pixel value ([R, G, B]=[0, 0, 0]) is assigned to the other portion BK.

Figure 26B:
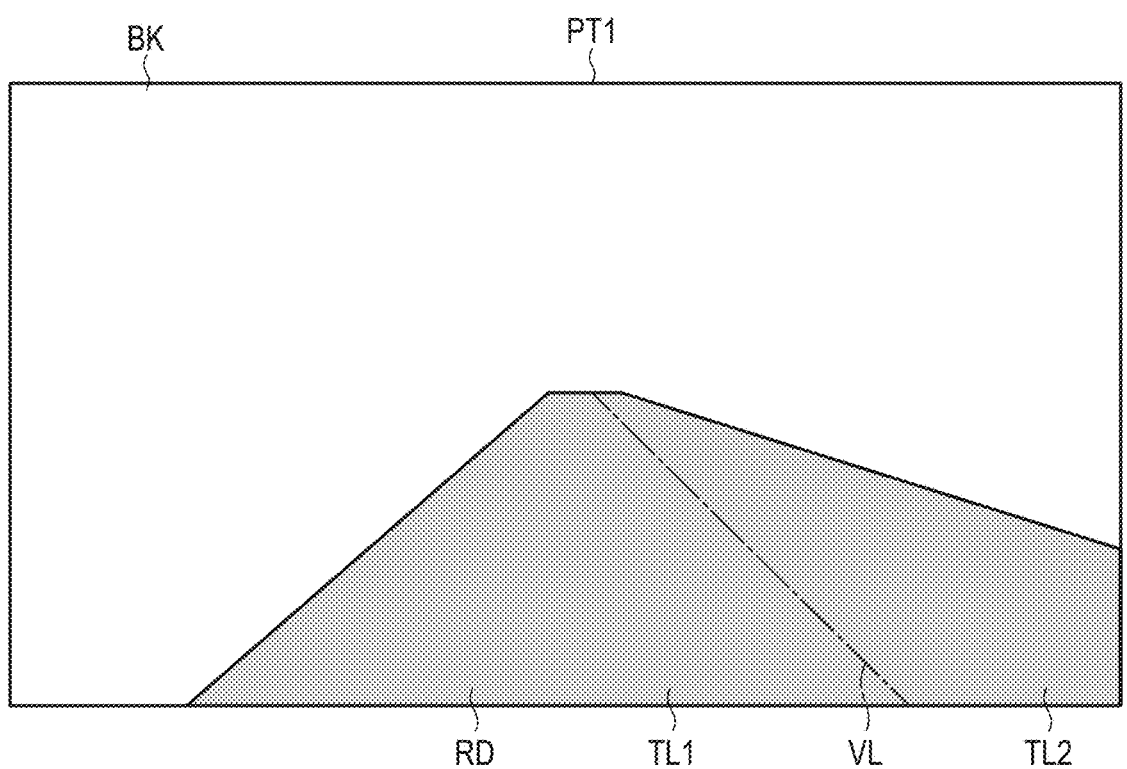
FIG. 26B is a diagram showing an example in which a virtual line for distinguishing a traveling lane is drawn with respect to the region pattern shown in FIG. 26A.

FIG. 26B is a diagram in which a virtual line VL for distinguishing the traveling lanes is drawn with respect to the region pattern PT1 shown in FIG. 26A for the purpose of explanation. The road portion RD includes a region of a traveling lane TL1 in which the vehicle 6 is traveling and a region of a traveling lane TL2 on the right side thereof.

Figure 26C:
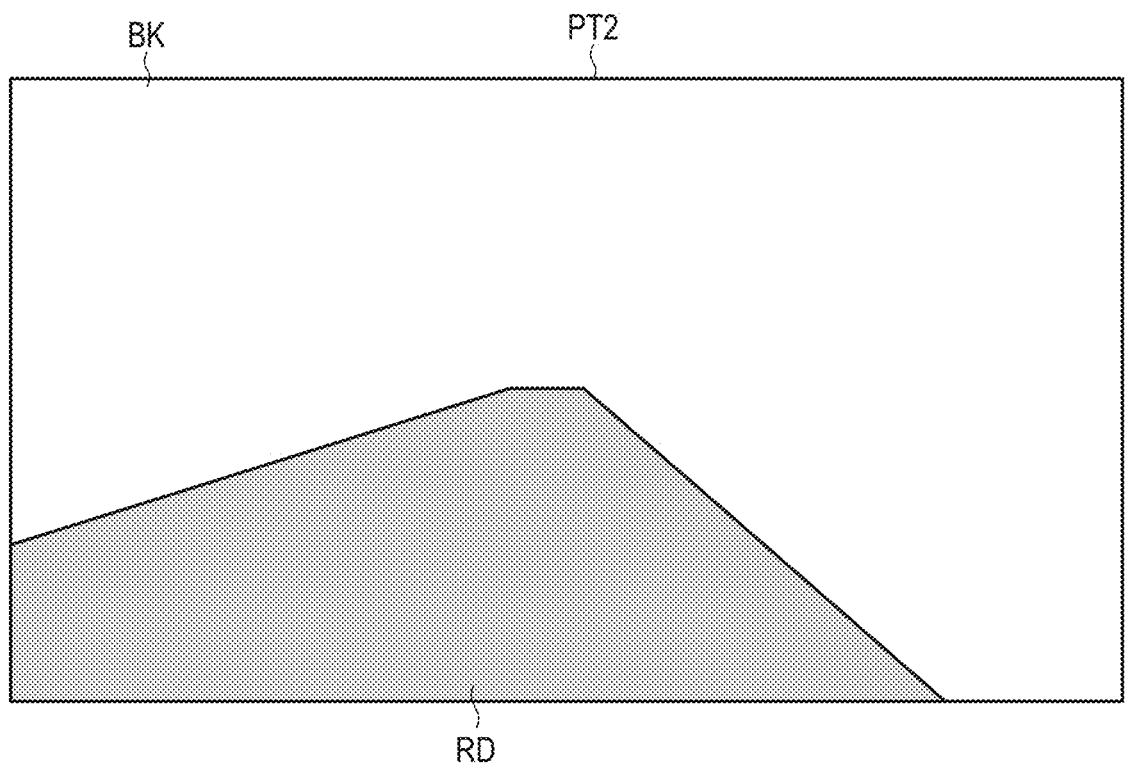
FIG. 26C is a diagram showing a second example of a region pattern.

FIG. 26C shows a region pattern PT2 set for each road as another example of the region pattern PT read out from the pattern storage unit 26. The region pattern PT2 shown in FIG. 26C is set for a national highway having two lanes on each side, and indicates a pattern of a road region shown in the image data acquired by the vehicle 6 traveling in the lane on the median strip side (right side). The region pattern PT2 includes a road portion RD (shaded portion) and a portion BK (colorless portion) other than the road portion RD.

Figure 26D:
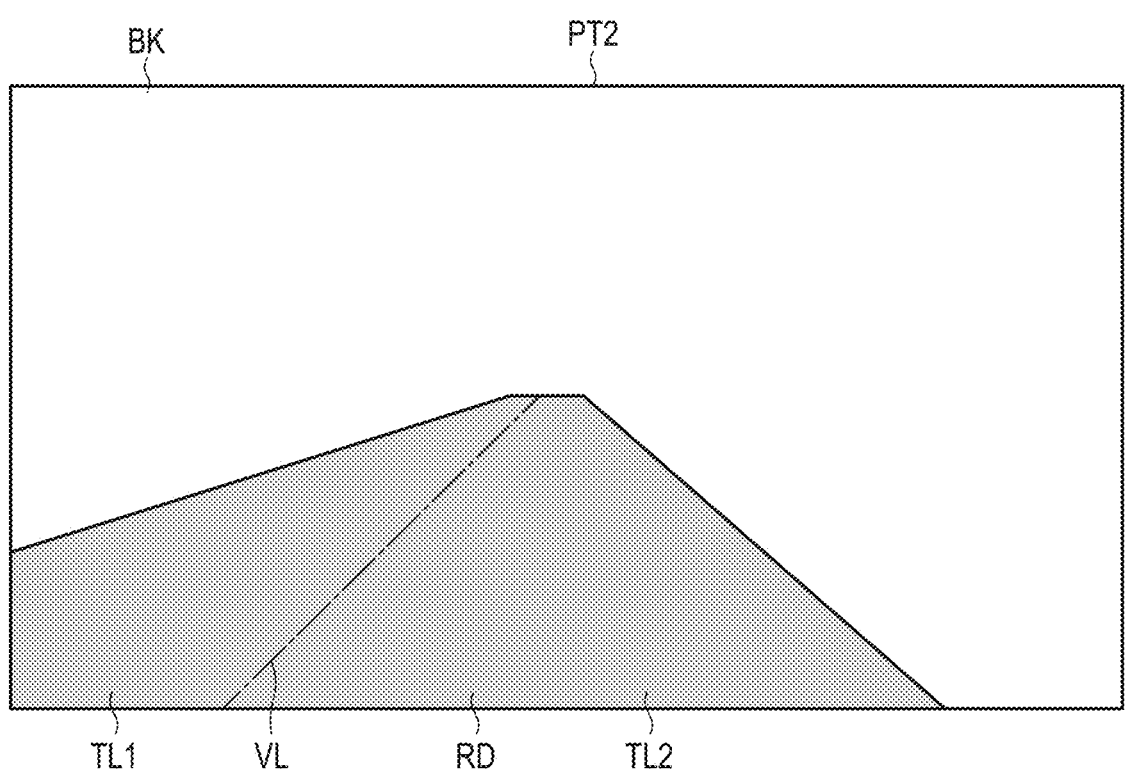
FIG. 26D is a diagram showing an example in which a virtual line for distinguishing a traveling lane is drawn with respect to the region pattern shown in FIG. 26C.

FIG. 26D is a diagram in which a virtual line VL for distinguishing the traveling lanes is drawn with respect to the region pattern PT2 shown in FIG. 26C for the purpose of explanation. The road portion RD includes a region of a traveling lane TL2 in which the vehicle 6 is traveling and a region of a traveling lane TL1 on the left side thereof.

As shown in FIG. 26A to FIG. 26D, the region pattern PT used in the estimation processing is set in advance for each road or each lane so as to reflect that the shape of the road region shown in the image imaged by the camera 2 mounted on the vehicle 6 is different depending on which lane the vehicle 6 is traveling in. The lane estimation processing unit 130 of the lane estimation device 1 according to the second embodiment performs estimation of a lane in which the vehicle is moving by comparing the road portion RD of the region pattern PT and the road region shown in the image data at a pixel level.

The pattern acquisition unit 1301 is configured to read out one or a plurality of region patterns PT necessary for lane estimation from the pattern storage unit 26 on the basis of the position data of the vehicle 6 detected by the GPS sensor 3. As an example, the pattern acquisition unit 1301 is configured to acquire, from the road information storage unit 23, information indicating a configuration of a road at a position where the vehicle 6 is currently traveling, based on position data of the vehicle 6 detected by the GPS sensor 3, and to read out, from the pattern storage unit 26, one or more necessary region patterns PT, based on the acquired information.

For example, based on the information that the road on which the vehicle is currently traveling is a national highway having two lanes on each side, the pattern acquisition unit 1301 is configured to read out the region pattern PT1 and the region pattern PT2 associated with "national highway having two lanes on each side". In a case where the road on which the vehicle is currently traveling is a national expressway having three lanes on each side, the pattern acquisition unit 1301 can read out three region patterns PT corresponding to a case where the vehicle is traveling in a road-shoulder-side lane, a case where the vehicle is traveling in a central lane, and a case where the vehicle is traveling in a median-strip-side lane, which are associated with the national expressway having three lanes on each side. These are merely examples, and the type and the number of the region patterns PT the pattern acquisition unit 1301 reads out from the pattern storage unit 26 may be arbitrarily set. Hereinafter, a description of the type of road (national highway, expressway, etc.) will be omitted.

Note that "each side" is used merely for convenience of explanation, and even in the case of a road region including an oncoming lane or a vehicle region, it is possible to estimate a lane by reading out N region patterns PT corresponding to each lane of an N-lane road. The pattern acquisition unit 1301 may acquire the region pattern PT directly from the road management server or the like through a communication unit (not shown).

The region pattern PT may be any pattern as long as it can be compared with the road region shown in the image data acquired by the vehicle 6. As described above, the region pattern PT2 shown in FIG. 26C relates to the image data acquired by the vehicle 6 traveling in the traveling lane TL2 on the median strip side of the road having two lanes on each side, and includes both the traveling lane TL1 and the traveling lane TL2. However, the region pattern PT does not need to include all the traveling lanes included in the road.

FIG. 27A to FIG. 27D show examples of such region patterns PT set for each lane.

Figure 27A:
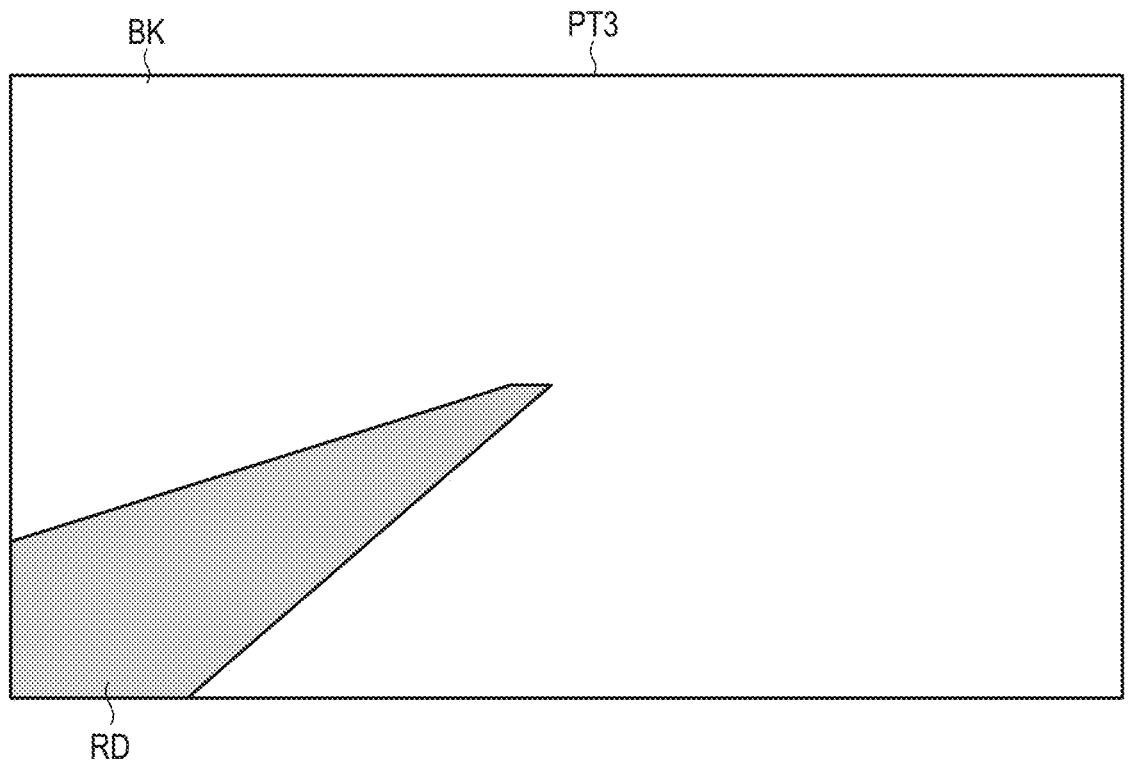
FIG. 27A is a diagram showing a third example of a region pattern.

FIG. 27A shows a region pattern PT3 for comparison with the road region RE shown in the image data in the case where there is a lane to the left of the lane in which the vehicle 6 itself is traveling. The region pattern PT3 includes a road portion RD obtained by cutting out only a region related to the traveling lane TL1 from the region pattern PT2 shown in FIG. 26C, and a portion BK other than the road portion RD.

For example, in a case where the vehicle 6 is traveling on a road having two lanes on each side, the lane estimation processing unit 130 determines whether or not the road region RE in the processed image data TVD includes a region similar to the region pattern PT3 shown in FIG. 27A. In a case where it includes a similar region, the vehicle 6 can be estimated to be traveling in the lane TL2 on the median strip side, and, in a case where it does not include a similar region, the vehicle 6 can be estimated to be traveling in the lane TL1 on the road shoulder side.

Figure 27B:
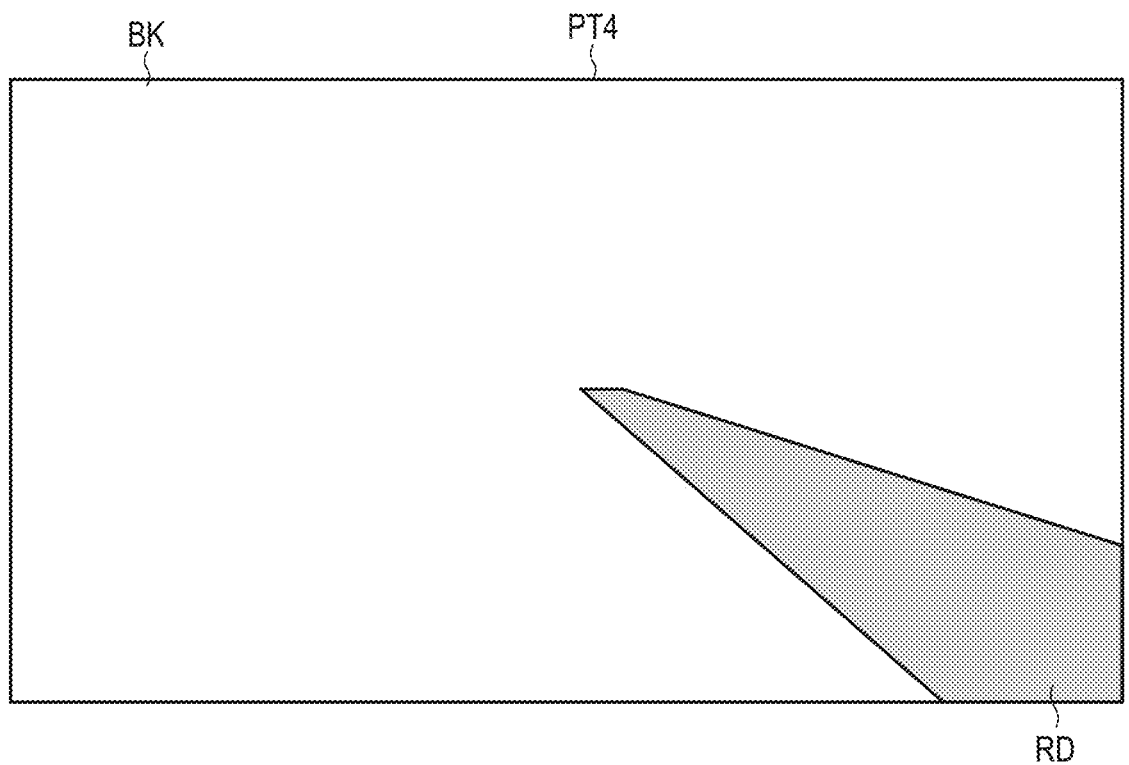
FIG. 27B is a diagram showing a fourth example of a region pattern.

FIG. 27B shows a region pattern PT4 for comparison with the road region RE shown in the image data in a case where a lane exists on the right side of the lane in which the vehicle 6 itself is traveling. The region pattern PT4 includes a road portion RD obtained by cutting out only a region related to the traveling lane TL2 from the region pattern PT1 shown in FIG. 26A, and a portion BK other than the road portion RD.

Figure 27C:
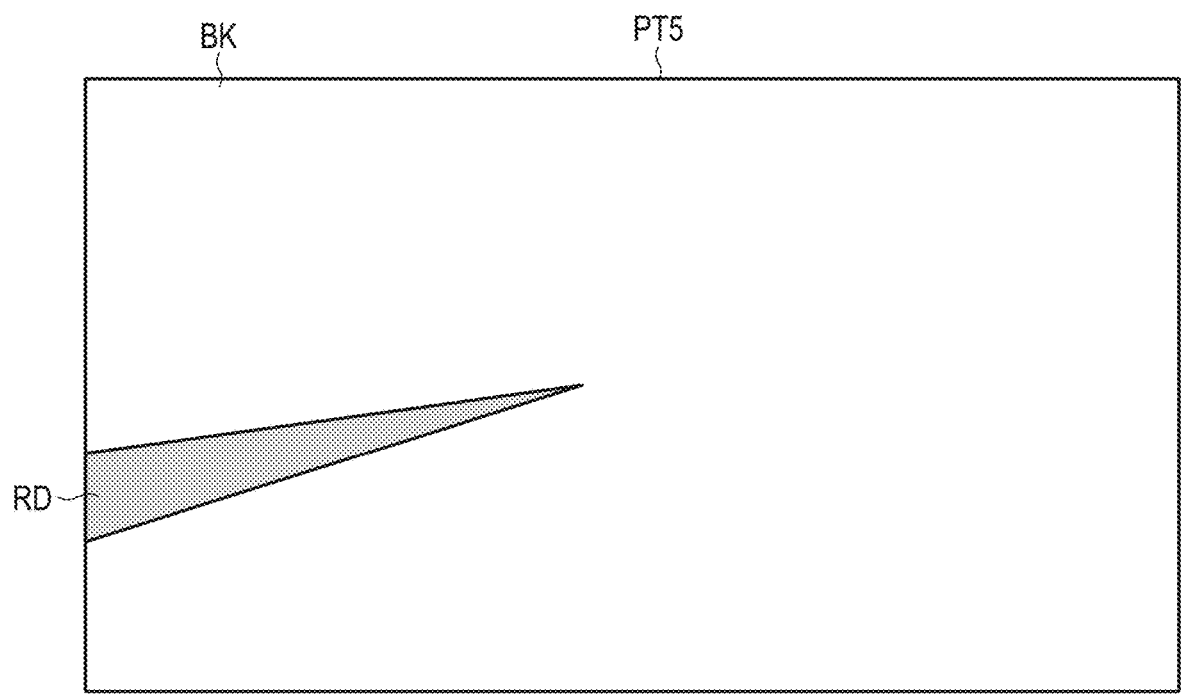
FIG. 27C is a diagram showing a fifth example of a region pattern.

FIG. 27C shows a region pattern PT5 for comparison with the road region RE shown in the image data in a case where another lane exists to the left of the left side lane of the lane in which the vehicle 6 itself is traveling, such as a road having three lanes on each side. The region pattern PT5 includes a road portion RD relating to a traveling lane that is not included in the region pattern PT2 shown in FIG. 26C.

Figure 27D:
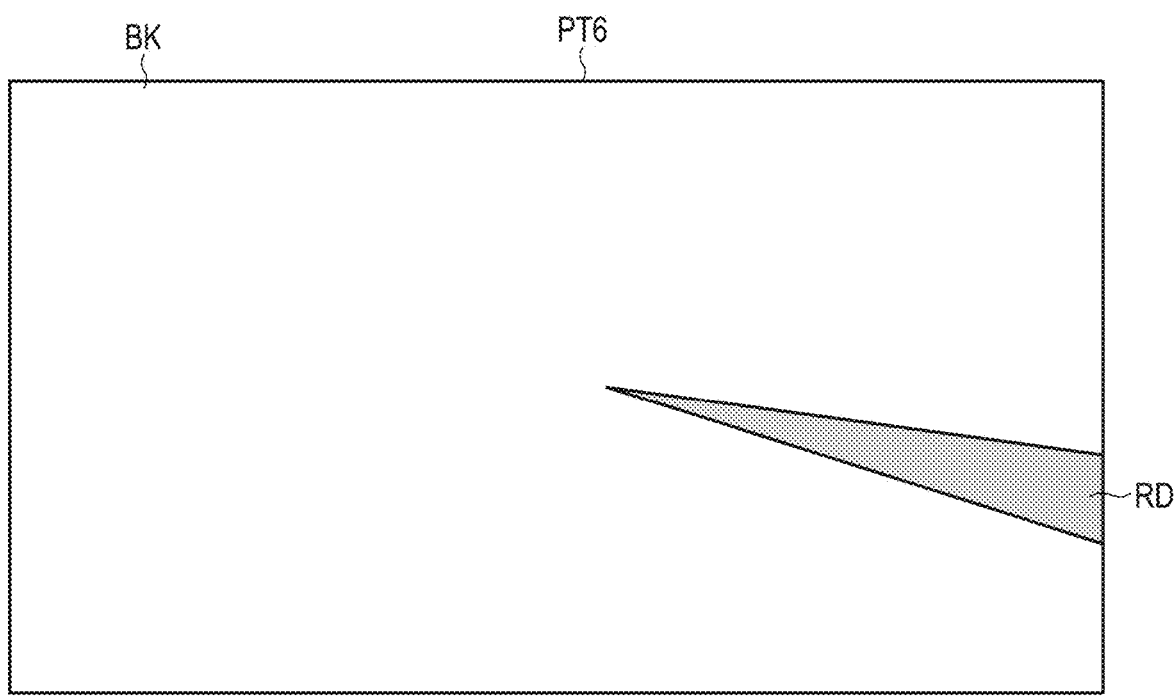
FIG. 27D is a diagram showing a sixth example of a region pattern.

FIG. 27D shows a region pattern PT6 for comparison with the road region RE shown in the image data in a case where another lane exists to the right of the right side lane of the lane in which the vehicle 6 itself is traveling, such as a road having three lanes on each side. The region pattern PT6 also includes a road portion RD relating to a traveling lane that is not included in the region pattern PT1 shown in FIG. 26A.

By using the region patterns PT shown in FIG. 27A to FIG. 27D, the area to be compared becomes smaller, and the lane estimation device 1 can determine the degree of similarity with fewer processes. The region patterns PT shown in FIG. 27A to FIG. 27D are merely examples. The region patterns PT may be variously changed depending on the presence or absence of a road shoulder, the width of each lane, the presence or absence of a median strip, the radius of curvature of a road, and the like.

Whether the pattern acquisition unit 1301 should read out the region pattern PT of the entire road as shown in FIG. 26A to FIG. 26D or should read out the region pattern PT for each lane as shown in FIG. 27A to FIG. 27D may be arbitrarily set by a user or the like of the lane estimation device 1. The pattern acquisition unit 1301 may acquire the region pattern PT directly from the road management server or the like through a communication unit (not shown).

(2-3) Determination of Degree of Similarity

Under the control of the similarity determination unit 1302, in step S303, the lane estimation processing unit 130 then compares the road region RE extracted from the image data VD with the road portion RD of the region pattern PT read out by the pattern acquisition unit 1301 at a pixel level. The lane estimation processing unit 130 is assumed to perform preprocessing such as size adjustment and inclination adjustment in advance on the processed image data TVD and the region pattern PT so that they can be compared with each other. The lane estimation processing unit 130 is also assumed to perform necessary calibration in advance in accordance with the vehicle height of the vehicle 6, the appearance of the hood in the image data VD, and the like in addition to the individual difference in performance, the inclination at the time of installation, and the like of the camera 2.

First, the similarity determination unit 1302 acquires pixel value data indicating a pixel value at each pixel position for each of the processed image data TVD and the region pattern PT. As described above, in the processed image data TVD, each pixel position is labeled with a different color (pixel value) by the region extraction processing by the road region extraction unit 131. Similarly, in the region pattern PT, different RGB values are assigned to the respective pixel positions.

The similarity determination unit 1302 reads out the RGB values at each pixel position stored in the form of, for example, a two-dimensional array from each pixel value data, compares the RGB values at each pixel position, and determines whether the RGB values are the same. The similarity determination unit 1302 may perform comparison for all pixel positions or may perform comparison only for pixel positions corresponding to the road portion RD in the region pattern PT. The comparison processing will be further described later.

In step S304, under the control of the similarity determination unit 1302, the lane estimation processing unit 130 then determines the overall degree of similarity based on the comparison result for each pixel. As an example, the similarity determination unit 1302 determines the degree of similarity by calculating a ratio of the number of pixels determined to have the same RGB value to the total number of compared pixels.

In step S305, the lane estimation processing unit 130 determines whether or not the similarity determination processing by the similarity determination unit 1302 has been completed for all the region patterns PT read out from the pattern storage unit 26 by the pattern acquisition unit 1301. In the case where there is an uncompared region pattern PT (branch of NO), steps S303 to 304 are repeated for the uncompared region pattern PT. In the case where the similarity determination processing has been completed for all of the region patterns PT (branch of YES), the processing proceeds to step S306.

In step S306, under the control of the similarity determination unit 1302, the lane estimation processing unit 130 passes the similarity determination result to the lane estimation unit 1303. In one example, the similarity determination unit 1302 selects the region pattern PT having the highest degree of similarity among the plurality of region patterns PT for which the degree of similarity has been determined, and passes the selected region pattern PT to the lane estimation unit 1303 together with the determined degree of similarity. The number of region patterns PT selected by the similarity determination unit 1302 is not limited to one, and a plurality of region patterns PT satisfying a certain criterion may be selected. For example, the similarity determination unit 1302 may be configured to pass all the region patterns PT for which it is determined that the degree of similarity with the image data TVD exceeds a predetermined threshold value to the lane estimation unit 1303. Alternatively, in a case where only one region pattern PT is read out by the pattern acquisition unit 1301, the similarity determination unit 1302 may be configured to determine whether the degree of similarity exceeds a predetermined threshold value and pass the region pattern PT to the lane estimation unit 1303 together with the determination result.

(2-4) Lane Estimation

In step S307, under the control of the lane estimation unit 1303, the lane estimation processing unit 130 performs processing of estimating in which lane the vehicle 6 is traveling based on the similarity determination result received from the similarity determination unit 1302. For example, in a case where it is determined by GPS information that the vehicle 6 is traveling on a road having two lanes on each side, the region pattern PT1 and the region pattern PT2 are read out by the pattern acquisition unit 1301, and the region pattern PT1 is determined to have a higher degree of similarity by the similarity determination unit 1302, the lane estimation unit 1303 can estimate that the lane in which the vehicle 6 is traveling is the lane TL1 on the road shoulder side of the road having two lanes on each side.

Alternatively, for example, in a case where the pattern acquisition unit 1301 is set to read out only the region pattern PT1 when the vehicle is traveling on a road having two lanes on each side, the lane estimation unit 1303 can estimate the lane based on only the degree of similarity between the image data TVD and the region pattern PT1. In this case, if the degree of similarity to the region pattern PT1 received from the similarity determination unit 1302 exceeds a predetermined threshold value, the lane estimation unit 1303 can estimate that the lane in which the vehicle 6 is traveling is the lane TL1 on the road shoulder side of the road having two lanes on each side, and, if the degree of similarity to the region pattern PT1 is equal to or less than the predetermined threshold value, the lane estimation unit 1303 can estimate that the lane in which the vehicle 6 is traveling is the lane TL2 on the median strip side of the road having two lanes on each side.

As another example, in the case where the vehicle is determined to be traveling on a road having two lanes on each side by the GPS information, the pattern acquisition unit 1301 may be set to read out the region patterns PT3 and PT4 shown in FIG. 27A and FIG. 27B. In such a case, when the similarity determination unit 1302 determines that the degree of similarity of the region pattern PT3 is higher than that of the region pattern PT4, the lane estimation unit 1303 determines that a traveling lane exists on the left side of the lane in which the vehicle 6 itself is traveling, and can estimate that the vehicle 6 itself is traveling in the lane TL2 on the median strip side of the road having two lanes on each side.

As yet another example, in the case where it is determined that the vehicle is traveling on a road having three lanes on each side by the GPS information, the pattern acquisition unit 1301 may be set to read out the region patterns PT3 to PT6 shown in FIG. 27A to FIG. 27D, and the similarity determination unit 1302 may be set to select a region pattern PT having a degree of similarity exceeding a predetermined threshold value. For example, in a case where the region pattern PT3 and the region pattern PT4 are selected by the similarity determination unit 1302, the lane estimation unit 1303 can determine that the vehicle 6 is traveling in the center lane of a road having three lanes on each side. Alternatively, in a case where the region pattern PT3 and the region pattern PT5 are selected by the similarity determination unit 1302, the lane estimation unit 1303 can determine that the vehicle 6 is traveling in a lane on the median strip side of a road having three lanes on each side.

The lane estimation processing unit 130 may determine the tolerance of the degree of similarity based on a preset threshold value stored in the threshold value storage unit 25. For example, in a case where the region pattern PT having the highest degree of similarity is received from the similarity determination unit 1302, if the degree of similarity is below a preset threshold value, the processing may be suspended, and an error message indicating that estimation is impossible may be output. The threshold value may be a constant value regardless of the lane, or may be a value set for each lane or each region pattern PT. Alternatively, the lane estimation processing unit 130 may suspend the processing and output an error message also in a case where, for example, there is not a sufficient number of region patterns PT having similarities exceeding the predetermined threshold value received from the similarity determination unit 1302, and the lane estimation unit 1303 cannot estimate the traveling lane. In this case, new image data VD may be acquired to redo the processing.

(3) Correction of Lane Estimation Result

In the same manner as in the first embodiment, the control unit 10 of the lane estimation device 1 then determines the accuracy (validity) of the lane estimated by the lane estimation processing unit 130 in step S4 shown in FIG. 5 under the control of the lane correction unit 14, and executes processing of correcting the estimation result of the lane in the case where it is determined that the lane is not valid. The processing procedure and processing contents of the lane correction unit 14 may be the same as those described with reference to FIG. 8.

(4) Output of Lane Estimation Data

The control unit 10 executes control for outputting the lane estimation result in step S5 under the control of the estimation data output control unit 19. This processing can be executed in the same manner as in the first embodiment.

(5) Other Embodiments

Figure 28A:
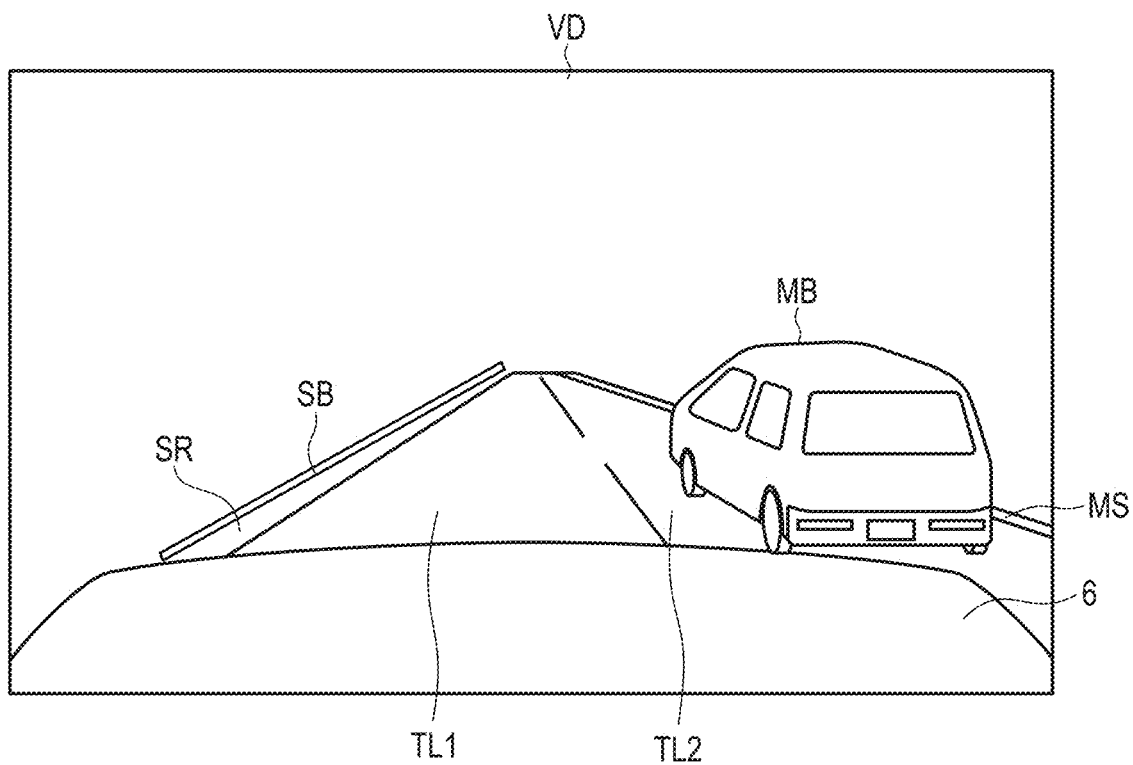
FIG. 28A is a diagram showing a third example of image data of a road obtained when a progression direction is imaged by an on-vehicle camera.

FIG. 28A shows another example of the still-image data VD in the case where there is another traveling vehicle MB. The still-image data VD is, for example, imaged by the camera 2 mounted on the vehicle 6 traveling in the lane TL1 on the road shoulder side of a road having two lanes on each side as shown in FIG. 10, and is subjected to image processing by the image data acquisition unit 11. In the still-image data VD of FIG. 28A, similarly to the image data VD shown in FIG. 25A, the hood portion of the vehicle 6 itself, the median strip MS, the traveling lanes TL1 and TL2, the road shoulder SR, and the curb SB, and, furthermore, another vehicle MB traveling in the traveling lane TL2 are displayed.

Figure 28B:
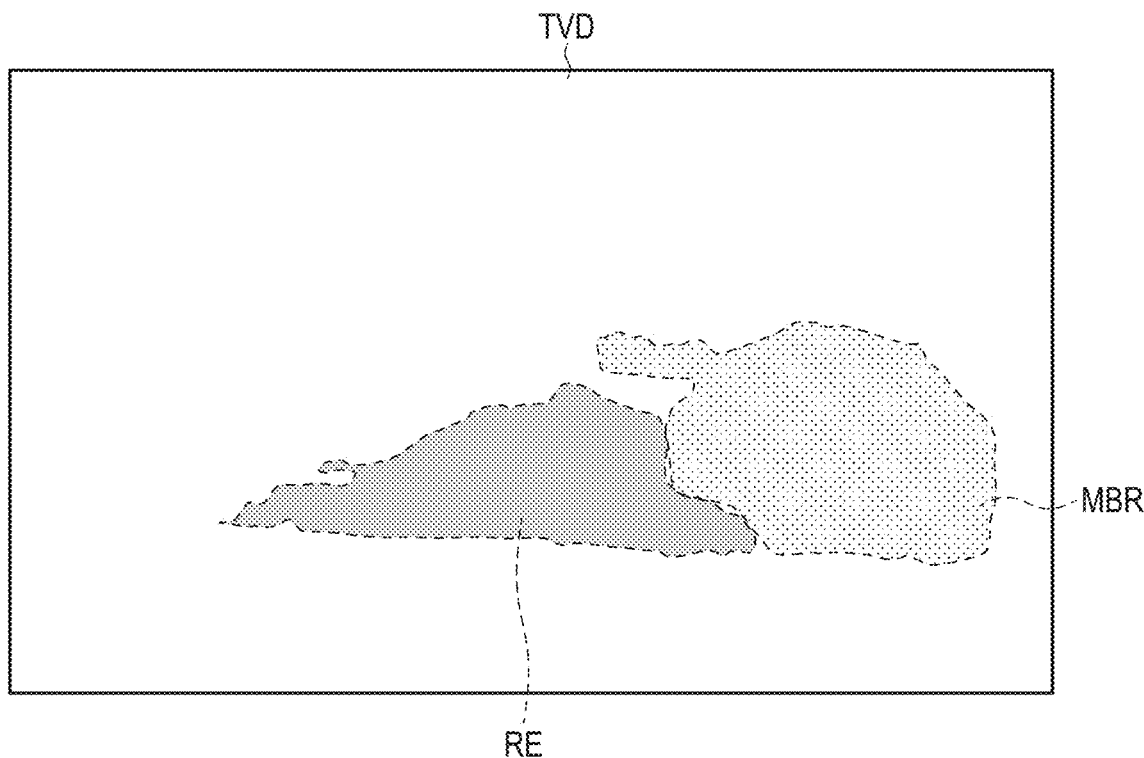
FIG. 28B is a diagram showing a third example of a result of extracting diagrams indicating a road region and other vehicles from the image data shown in FIG. 28A.

FIG. 28B shows an example of the output result of the extraction processing performed on the image data VD shown in FIG. 28A using SegNet by the road region extraction unit 131. In FIG. 28B, a road region RE (shaded portion) and a region MBR (dot-hatched portion) including the other vehicle MB are extracted from the processed image data TVD. Again, each region is given a color corresponding to labeling on a pixel basis. Here, the road region RE is labeled with green ([R, G, B]=[0, 255, 0]), the vehicle region MBR is labeled with red ([R, G, B]=[255, 0, 0]), and the other regions are labeled with black ([R, G, B]=[0, 0, 0]).

In this embodiment, it is known from the GPS information that the vehicle 6 itself is traveling on a road having two lanes on each side, therefore, the pattern acquisition unit 1301 reads out the region pattern PT1 and the region pattern PT2 from the pattern storage unit 26. FIG. 28B shows an example in which the accuracy of region extraction is slightly low, and approximation processing is not performed. The road region RE and the vehicle region MBR include uneven contour line portions caused by erroneous detection.

Figure 29:
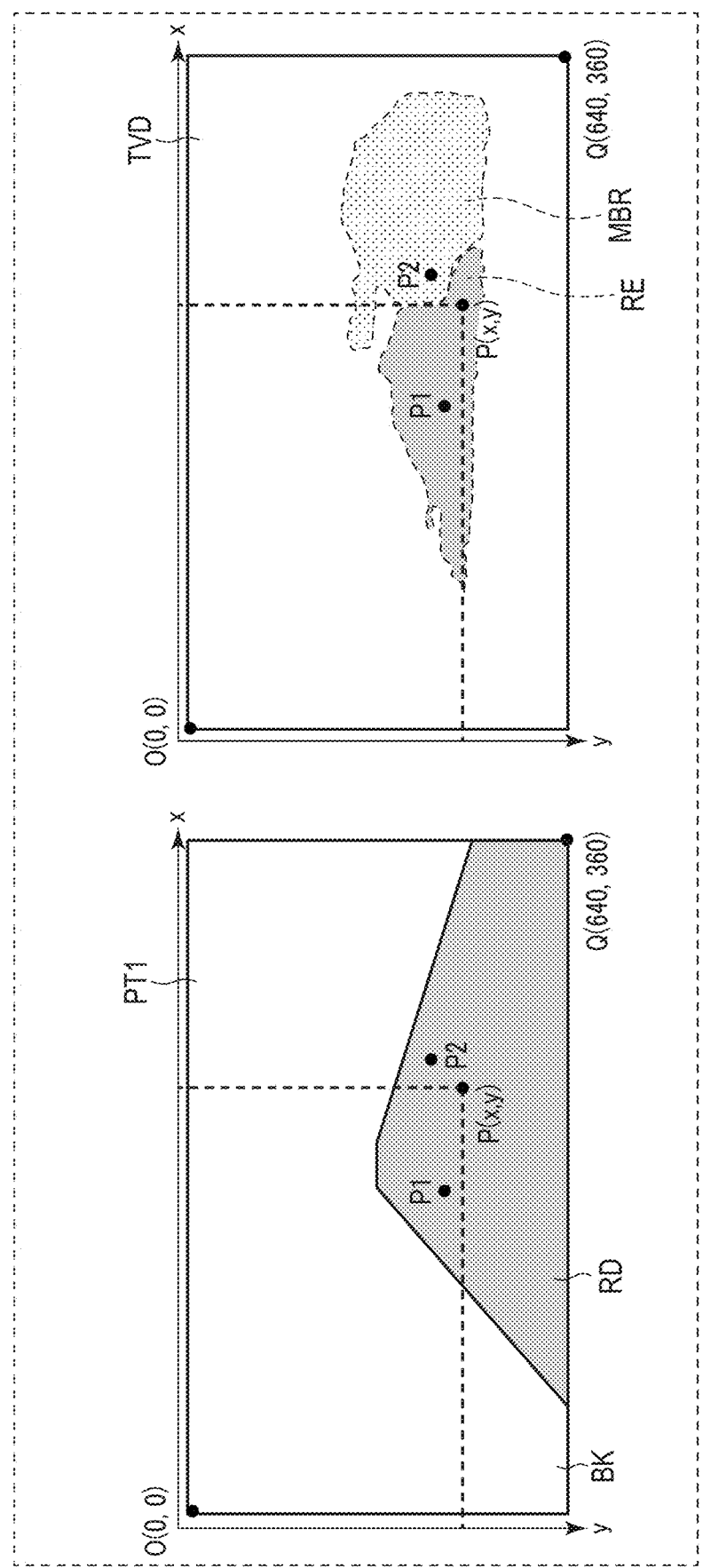
FIG. 29 is a diagram showing an example of an image to be compared with a region pattern at a pixel level based on an extraction result from image data.

FIG. 29 shows an example of processing of determining the degree of similarity between the region pattern PT1 and the processed image data TVD by the similarity determination unit 1302. In this example, the similarity determination unit 1302 compares pixel values at each coordinate point P with the upper left of each image as the origin, the horizontal direction of the image as the x-axis, the vertical direction of the image as the y-axis, and each pixel position as the coordinate point P (x, y). The comparison of the pixel values may be performed over the entire image or may be performed only on the coordinates corresponding to the road portion RD in the region pattern PT1. In this example, the coordinates of the lower right point Q of each image are (640,360).

In FIG. 29, a point P1 is located in a green region recognized as a road in both the pattern PT1 and the image data TVD, and the RGB values match. Therefore, the similarity determination unit 1302 can perform processing of, for example, setting a flag indicating that the pixel values match for the point P1. On the other hand, the point P2 located in the road portion RD in the pattern PT1, however, is located in the region MBR identified as the vehicle in the image data TVD. Therefore, the similarity determination unit 1302 determines that the pixel values of the point P2 do not match.

Here, in one embodiment, the similarity determination unit 1302 may be configured to determine that the pixel values of the coordinate points included in the road portion RD of the region pattern PT match as long as the coordinate points are included in either the road portion RD (shaded portion) or the vehicle region MBR (dot-hatched portion) in the image data TVD. In other words, the similarity determination unit 1302 according to this embodiment is configured to determine that only a black region (a colorless region in the drawing) in which nothing is extracted in the image data TVD does not match the coordinate points included in the road portion RD of the region pattern PT.

That is, the similarity determination unit 1302 uses the entire shape RE+MBR including the region MBR of the object present on the road region in the road region RE for comparison with the region pattern PT. As described above, even when an object such as another traveling vehicle exists on the road region and a part of the road region cannot be extracted on the image data, the information can be easily complemented by regarding the coordinate point corresponding to the road part RD of the region pattern PT as the road region. The similarity determination may be performed on the assumption that the vehicle region MBR is different from the road region RE as labeled.

As yet another example for explaining the similarity determination, FIG. 30 shows an image in which a road portion PT3-RD (the contour line thereof shown in alternate long and short dashed lines) of the pattern PT3 shown in FIG. 27A and the road region RE in the processed image data TVD shown in FIG. 28B are superimposed. As shown in FIG. 30, the similarity determination unit 1302 may determine the degree of similarity for only the road portion PT3-RD. In this case, the lane estimation device 1 compares the pixel value of each coordinate point in the road portion PT3-RD with the pixel value of the corresponding coordinate point in the image data TVD. If there are more than a certain number of coordinate points in the road portion PT3-RD whose pixel values match the pixel values of the image data TVD, the lane estimation device 1 can estimate that there is a lane in this region, that is, the vehicle 6 itself is traveling in the traveling lane TL2 on the median strip side. On the other hand, if the number of coordinate points in the road portion PT3-RD whose pixel values matching the pixel values of the image data TVD is equal to or less than a certain number, the lane estimation device 1 can estimate that there is no lane in this region, that is, the vehicle 6 itself is traveling in the traveling lane TL1 on the road shoulder side.

According to the example shown in FIG. 30, by using a region pattern PT corresponding to a part of the lane such as the pattern PT3, the lane estimation device 1 can perform lane estimation without any problem even in a case where another vehicle is traveling in the same lane ahead of the vehicle 6 itself. In addition, the lane estimation device 1 can set a smaller area as a comparison target, and can perform lane estimation by a small number of comparison processes.

The region pattern PT to be used for comparison may be arbitrarily set by the user of the lane estimation device 1 or the like in accordance with the state of the road, the speed of processing, the accuracy of estimation, and the like.

The lane estimation device 1 may also be configured to cut out the upper portion and the lower portion of the image and each region pattern PT (for example, cut out an upper portion of 640×100 and a lower portion of 640×60 of the image of 640×360) and compare the pixel values for only the remaining portion. This makes it possible to reduce the calculation cost for lane estimation. Furthermore, as shown in FIG. 25A and FIG. 28A, in a case where the hood portion of the vehicle 6 itself is shown in the image data VD, the image corresponding to the hood portion 6 and the lower portion of each region pattern PT may be cut out, and the comparison of pixel values may be performed only in the remaining portion. Since this will reduce the determination error of the degree of similarity caused by differences in the hood shape, a common region pattern PT will be able to be used among different vehicle types.

(Effect)

As described above in detail, the lane estimation device 1 according to the second embodiment extracts the shape indicating the road region from the image data obtained by imaging the traveling direction of the vehicle 6, and, based on the shape indicating the road region, acquires the pixel value data obtained by labeling each pixel in the road region as the feature value. The lane in which the vehicle 6 is moving is estimated by determining which preset pattern for each road or each lane the pixel value data is similar to.

As described above, according to the second embodiment, it is possible to estimate the lane in which the vehicle 6 is moving by focusing on the feature of the shape indicating the road region in the progression direction viewed from the moving vehicle 6 being different depending on the lane in which the vehicle 6 is moving, and comparing the shape with the preset pattern based on the pixel value obtained by labeling each pixel. Therefore, it is possible to estimate the lane in which the vehicle is traveling without depending on the lane marker that divides the lanes on the road, and thus it is possible to accurately estimate the lane even in a case where, for example, a repair mark of the lane marker remains due to construction or the like or the lane marker fades or disappears due to deterioration over time.

In one embodiment, the region pattern PT corresponding to all the lanes on the road is used for comparison, thereby the accuracy of estimation is expected to improve. In another embodiment, the region pattern PT corresponding to one of the lanes on the road is used for comparison, thereby the processing speed is expected to increase and the influence of other vehicles is expected to decrease.

Furthermore, in one embodiment, even when an object such as another traveling vehicle exists on the road region, the degree of similarity for the coordinate point in the road portion RD in the region pattern is determined by regarding the object as a part of the road. Therefore, even when the information obtained from the road region shown in the image data is insufficient due to the presence of an object such as another traveling vehicle, the lane can be estimated by complementing the information based on the shape of the object.

Other Embodiments (1) In each of the above embodiments, a case where the lane estimation device 1 is mounted on the vehicle has been described as an example. However, the present invention is not limited thereto, and the lane estimation device 1 may be installed on a cloud computer or an edge router, and the vehicle 6 may transmit the image data obtained by the camera 2, the position data obtained by the GPS sensor 3, and the vehicle sensor data obtained by the vehicle sensor 4 from the on-vehicle communication device to the lane estimation device on the cloud or the edge router so that the lane estimation device can receive each type of data above to execute lane estimation processing.

In this case, each processing unit included in the lane estimation device may be distributed to an on-vehicle device, a cloud computer, an edge router, and the like so that these devices cooperate with each other to obtain the lane estimation data.

The various functional units described in each of the embodiments may be realized by using a circuit. The circuit may be a dedicated circuit that realizes a specific function, or may be a general-purpose circuit such as a processor.

At least a part of the processing of each of the above-described embodiments can also be realized by using, for example, a processor mounted on a general-purpose computer as basic hardware. The program for realizing the above-described processing may be provided by being stored in a computer-readable recording medium. The program is stored in a recording medium as a file in an installable format or a file in an executable format. Examples of the recording medium include a magnetic disk, an optical disk (such as a CD-ROM, a CD-R, or a DVD), a magneto-optical disk (such as an MO), and a semiconductor memory. The recording medium may be any medium as long as it can store a program and can be read by a computer. Furthermore, the program for realizing the above-described processing may be stored in a computer (server) connected to a network such as the Internet and downloaded to a computer (client) via the network.

(2) In each of the above-described embodiments, a case where the lane estimation data obtained by the lane estimation device 1 is output to the autonomous driving controller 5, and the autonomous driving controller 5 uses the lane estimation data to cause the vehicle 6 to travel in a lane or to control lane changes has been described as an example. However, the present invention is not limited thereto, and the lane estimation data may be output to the drive recorder, and the drive recorder may record the lane estimation data as one piece of travel history information of the vehicle 6.

Furthermore, the lane estimation data may be transmitted to, for example, a road management server, and the road management server may use the lane estimation data as data for monitoring a traffic volume, predicting a traffic jam, or the like for each lane of a road. In this case, the lane change instruction information may be presented to the vehicle based on the prediction result of the traffic jam or the like. Furthermore, by inputting the lane estimation data to a navigation device mounted on the vehicle, for example, change instruction information of the traveling lane of the vehicle may be presented to the driver according to the destination.

(3) In each of the above-described embodiments, the vehicle 6 such as an automobile is taken as an example of the moving object, and an example of a case in which the vehicle 6 travels on a road having two lanes on each side is described. However, the moving object is not limited thereto, and may be, for example, a motorcycle, a bicycle, a personal mobility vehicle, a vehicle towed by livestock such as a carriage, or an agricultural vehicle such as a tiller, or even a pedestrian.

In the case of a motorcycle, it is determined whether or not the lane in which the motorcycle is currently traveling is a lane that can be traveled in based on, for example, an estimation result of the traveling lane and information indicating the displacement of the motorcycle registered in advance. If the motorcycle is traveling in a lane in which a motorcycle should not travel, a warning message by synthesized voice or ringing may be output. Similarly, in the case of a bicycle, it is determined whether the bicycle is traveling in a dedicated bicycle lane set on the road in a predetermined direction based on, for example, an estimation result of the traveling lane and the detection result of the traveling direction. If the bicycle is traveling in a lane other than a dedicated bicycle lane or if the bicycle is traveling in a reverse direction in the dedicated bicycle lane, a warning message by synthesized voice or ringing may be output to the driver.

In addition, the type of the road to be estimated may be an expressway, a toll road, a cycling road, a sidewalk, or an agricultural road other than a general road having two lanes on each side. The configuration of the lane estimation device, the processing procedure and processing content of the lane estimation method, the configuration of the road to be estimated, and the like can be variously modified without departing from the gist of the present invention.

(4) In each of the above-described embodiments, the image data used for lane estimation is described as being obtained by the camera 2 imaging a range including a road region in the traveling direction of the vehicle 6. However, the image data used for lane estimation is not limited to this, and may be image data obtained by the camera 2 imaging a range including a road region in another direction, such as at the rear of the vehicle 6.

(5) In the second embodiment, an example of determining the degree of similarity by comparing the road region RE of the image data TVD with the road portion RD of the region pattern PT has been described. However, it is also possible to determine the degree of similarity by comparing a region other than the road region (non-road region) with the portion BK other than the road portion RD of the region pattern PT.

The present invention is not limited exactly to the above-described embodiments, and can be embodied by modifying its structural elements at the implementation stage without departing from the gist thereof. In addition, various inventions can be made by suitably combining the structural elements disclosed in connection with the above embodiments. For example, some of the structural elements may be deleted from all of the structural elements described in the embodiments. Furthermore, the structural elements of different embodiments may be appropriately combined.

SUPPLEMENTARY NOTE

Some or all of the above-described embodiments can be described as shown in the following supplementary notes in addition to the claims, but are not limited thereto.

[C1]

A lane estimation device comprising:
an image acquisition unit configured to acquire image data obtained by imaging a range including a road region in which a moving object is moving;
a feature value calculation unit configured to recognize a shape indicating the road region from the acquired image data, and calculate a feature value of the road region based on the recognized shape; and
an estimation processing unit configured to estimate a lane in which the moving object is moving based on the calculated feature value.

[C2]

The lane estimation device according to C1 above, wherein
the feature value calculation unit calculates, based on the recognized shape indicating the road region, an inclination angle of a contour line thereof as the feature value of the road region, and
the estimation processing unit estimates the lane in which the moving object is moving by determining which threshold value range preset for each lane the calculated inclination angle of the contour line is included in.

[C3]
The lane estimation device according to C1 above, wherein
the feature value calculation unit calculates, based on the recognized shape indicating the road region, at least one of center-of-gravity coordinates for a diagram indicating the shape, an angle of one vertex of the diagram indicating the shape or an angle of one vertex of a virtual diagram derived from the diagram, and an area of the diagram indicating the shape; and
the estimation processing unit estimates the lane in which the moving object is moving by determining which threshold value range preset for each lane the calculated center-of-gravity coordinates for the diagram, vertex angle, and diagram area are included in.

[C4]
The lane estimation device according to cl above, wherein
the feature value calculation unit calculates, based on the recognized shape indicating the road region, at least one of an angle between two sides of a diagram obtained by converting the shape into a triangle having one side in a vertical direction of a screen indicated by the image data, or an area of the converted diagram, as the feature value; and
the estimation processing unit estimates the lane in which the moving object is moving by determining which threshold value range preset for each lane the calculated angle between contour lines or area of the diagram is included in.

[C5]
The lane estimation device according to cl above, wherein
the feature value calculation unit recognizes, from the acquired image data, a first shape indicating the road region including an object present on the road region and a second shape indicating a region excluding the object from the road region, respectively, and estimates a contour line of the road region when the object is not present on the basis of the recognized first shape and second shape to calculate an inclination angle of the contour line; and
the estimation processing unit estimates the lane in which the moving object is moving by determining which threshold value range preset for each lane the calculated inclination angle of the contour line is included in.

[C6]
The lane estimation device according to C1 above, wherein
the feature value calculation unit acquires, based on the recognized shape indicating the road region, pixel value data labeled for each pixel in the road region as the feature value of the road region; and
the estimation processing unit estimates the lane in which the moving object is moving by determining which of a plurality of patterns preset for the road region the acquired pixel value data is similar to.

[C7]
The lane estimation device according to cl above, wherein
the feature value calculation unit acquires, based on the recognized shape indicating the road region, pixel value data labeled for each pixel in the road region as the feature value of the road region; and
the estimation processing unit estimates the lane in which the moving object is moving by determining which pattern preset for each lane included in the road region the acquired pixel value data is similar to.

[C8]
The lane estimation device according to cl above, wherein
the feature value calculation unit recognizes, from the acquired image data, a first shape indicating the road region including an object present on the road region, and acquire pixel value data labeled for each pixel in the first shape; and
the estimation processing unit estimates the lane in which the moving object is moving by determining which of a plurality of patterns preset for the road region or patterns preset for each lane included in the road region the acquired pixel value data is similar to.

[C9]
The lane estimation device according to any one of the above C1 to C8, further comprising a correction unit configured to correct, based on at least one of information indicating a lane change history of the moving object estimated from a lane estimation result obtained in the past by the estimation processing unit, information relating to a structure of the road region at a moving position of the moving object, or information indicating a lane change in the road region estimated from a state of movement of the moving object, a currently obtained lane estimation result by the estimation processing unit.

[C10]
A lane estimation method, wherein an information processing device estimates a lane in which a moving object is moving, the lane estimation method comprising:
acquiring image data obtained by imaging a range including a road region in which the moving object is moving;
recognizing a shape indicating the road region from the acquired image data and calculating a feature value of the road region based on the recognized shape; and
estimating a lane in which the moving object is moving based on the calculated feature value.

[C11]
A program for causing a processor included in the lane estimation device to execute processing of each unit included in the lane estimation device according to any one of C1 to C9.

[C12]
A lane estimation method for estimating a lane in which a moving object (6) is moving executed by a computer, the method comprising:
acquiring image data obtained by imaging a range including a road region in which the moving object (6) is moving;
recognizing a shape indicating the road region from the acquired image data and calculating a feature value of the road region based on the recognized shape; and
estimating a lane in which the moving object (6) is moving based on the calculated feature value.

[C13]
The method according to C12 above, wherein
the calculating the feature value includes calculating, based on the recognized shape indicating the road region, an inclination angle of a contour line thereof as the feature value of the road region, and
the estimating includes estimating the lane in which the moving object (6) is moving by determining which threshold value range preset for each lane the calculated inclination angle of the contour line is included in.

[C14]

The method according to C12 above, wherein the calculating the feature value includes calculating, based on the recognized shape indicating the road region, at least one of center-of-gravity coordinates for a diagram indicating the shape, an angle of one vertex of the diagram indicating the shape or an angle of one vertex of a virtual diagram derived from the diagram, and an area of the diagram indicating the shape; and the estimating includes estimating the lane in which the moving object (6) is moving by determining which threshold value range preset for each lane the calculated center-of-gravity coordinates for the diagram, vertex angle, and diagram area are included in.

[C15]

The method according to c12 above, wherein the calculating the feature value includes calculating, based on the recognized shape indicating the road region, at least one of an angle between two sides of a diagram obtained by converting the shape into a triangle having one side in a vertical direction of a screen indicated by the image data, or an area of the converted diagram, as the feature value; and the estimating includes estimating the lane in which the moving object (6) is moving by determining which threshold value range preset for each lane the calculated angle between contour lines or area of the diagram is included in.

[C16]

The method according to c12 above, wherein the calculating the feature value includes recognizing, from the acquired image data, a first shape indicating the road region including an object present on the road region and a second shape indicating a region excluding the object from the road region, respectively, and estimating a contour line of the road region when the object is not present on the basis of the recognized first shape and second shape to calculate an inclination angle of the contour line; and the estimating includes estimating the lane in which the moving object (6) is moving by determining which threshold value range preset for each lane the calculated inclination angle of the contour line is included in.

[C17]

The method according to C12 above, wherein the calculating the feature value including acquiring, based on the recognized shape indicating the road region, pixel value data labeled for each pixel in the road region as the feature value of the road region; and the estimating includes estimating the lane in which the moving object (6) is moving by determining which of a plurality of patterns preset for the road region the acquired pixel value data is similar to.

[C18]

The method according to c12 above, wherein the calculating the feature value including acquiring, based on the recognized shape indicating the road region, pixel value data labeled for each pixel in the road region as the feature value of the road region; and the estimating includes estimating the lane in which the moving object (6) is moving by determining which pattern preset for each lane included in the road region the acquired pixel value data is similar to.

[C19]

The method according to c12 above, wherein the calculating the feature value including recognizing, from the acquired image data, a first shape indicating the road region including an object present on the road region, and acquiring pixel value data labeled for each pixel in the first shape; and the estimating includes estimating the lane in which the moving object (6) is moving by determining which of a plurality of patterns preset for the road region or patterns preset for each lane included in the road region the acquired pixel value data is similar to.

[C20]

The method according to any one of C12 to C19 above, further comprising correcting, based on at least one of information indicating a lane change history of the moving object (6) estimated from a lane estimation result obtained in the past, information relating to a structure of the road region at a moving position of the moving object (6), or information indicating a lane change in the road region estimated from a state of movement of the moving object (6), a currently obtained lane estimation result.

[C21]

A lane estimation device (1) comprising means for performing the methods of any one of C12 to C19 above.

[C22]

A program, when executed by a computer, comprising instructions for causing the computer to execute the methods of any one of C12 to C19 above.

[C23]

A computer-readable storage medium, when executed by a computer, comprising instructions for causing the computer to execute the methods of any one of C12 to C19 above.

REFERENCE SIGNS LIST

1 . . . Lane estimation device
2 . . . Camera
3 . . . GPS sensor
4 . . . Vehicle sensor
5 . . . Autonomous driving controller
6 . . . Vehicle
10 . . . Control unit
10A . . . Hardware processor
10B . . . Program memory
11 . . . Image data acquisition unit
12 . . . Image processing unit
13 . . . Lane estimation processing unit
14 . . . Lane correction unit
15 . . . Past estimation data acquisition unit
16 . . . Road information acquisition unit
17 . . . Vehicle sensor data acquisition unit
18 . . . Vehicle action state estimation unit
19 . . . Estimation data output control unit
20 . . . Data memory
21 . . . Image data storage unit
22 . . . Lane estimation data storage unit
23 . . . Road information storage unit
24 . . . Vehicle sensor data storage unit
25 . . . Threshold value storage unit
26 . . . Pattern storage unit
30 . . . Input/output I/F
40 . . . Bus
130 . . . Lane estimation processing unit
1301 . . . Pattern acquisition unit
1302 . . . Similarity determination unit
1303 . . . Lane estimation unit
VD . . . Still-image data
TVD . . . Processed image data
TL1, TL2 . . . Traveling lane WL . . . Sidewalk
MS . . . Median strip
SR . . . Road shoulder
SB . . . Curb
SH . . . Planting
RE . . . Contour of road region
PT . . . Region pattern
RD . . . Contour of road portion
MBR . . . Vehicle region
GR . . . Guardrail

The invention claimed is:

1. A lane estimation device comprising a processor and a memory connected to the processor, the processor configured to:
    acquire image data obtained by imaging a range including a road region in which a moving object is moving, and store the acquired image data in the memory;
    read out the image data stored in the memory, recognize a shape indicating the road region from the image data, and calculate or estimate, based on the recognized shape indicating the road region, an inclination angle of a contour line thereof as a feature value of the road region; and
    estimate a lane in which the moving object is moving by determining which threshold value range preset for each lane the calculated inclination angle of the contour line is included in.

2. A lane estimation device comprising a processor and a memory connected to the processor, the processor configured to:
    acquire image data obtained by imaging a range including a road region in which a moving object is moving, and store the acquired image data in the memory;
    read out the image data stored in the memory, recognize a shape indicating the road region from the image data, and calculate, based on the recognized shape indicating the road region, at least one of center-of-gravity coordinates for a diagram indicating the shape, an angle of one vertex of the diagram indicating the shape or an angle of one vertex of a virtual diagram derived from the diagram, and an area of the diagram indicating the shape as a feature value of the road region; and
    estimate a lane in which the moving object is moving by determining which threshold value range preset for each lane the calculated center-of-gravity coordinates for the diagram, vertex angle, and diagram area are included in.

3. The lane estimation device according to claim 2, wherein the processor is further configured to:
    further calculate, based on the recognized shape indicating the road region, at least one of an angle between two sides of a diagram obtained by converting the shape into a triangle having one side in a vertical direction of a screen indicated by the image data, or an area of the converted diagram, as the feature value; and
    estimate the lane in which the moving object is moving by determining which threshold value range preset for each lane the calculated angle between contour lines or area of the diagram is included in.

4. The lane estimation device according to claim 1, wherein the processor is further configured to:
    recognize, from the acquired image data, a first shape indicating the road region including an object present on the road region and a second shape indicating a region excluding the object from the road region, respectively, and estimate a contour line of the road region when the object is not present on the basis of the recognized first shape and second shape to calculate an inclination angle of the contour line.

5. A lane estimation device comprising a processor and a memory connected to the processor, the processor configured to:
    acquire image data obtained by imaging a range including a road region in which a moving object is moving, and store the acquired image data in the memory;
    read out the image data stored in the memory, recognize a shape indicating the road region from the image data, and acquire, based on the recognized shape indicating the road region, pixel value data labeled for each pixel in the road region as a feature value of the road region; and
    estimate a lane in which the moving object is moving by determining which of a plurality of patterns preset for the road region or patterns preset for each lane included in the road region the acquired pixel value data is similar to.

6. The lane estimation device according to claim 1, wherein the processor is further configured to:
    recognize, from the acquired image data, a first shape indicating the road region including an object present on the road region, and acquire pixel value data labeled for each pixel in the first shape.

7. The lane estimation device according to claim 1, wherein the processor is further configured to:
    correct, based on at least one of information indicating a lane change history of the moving object estimated from a lane estimation result obtained in the past, information relating to a structure of the road region at a moving position of the moving object, or information indicating a lane change in the road region estimated from a state of movement of the moving object, a currently obtained lane estimation result.

8. A non-transitory tangible computer-readable storage medium having stored thereon a program for estimating a lane in which a moving object is moving according to claim 1.

* * * * *